US012800489B2

(12) United States Patent
Masukawa et al.

(10) Patent No.: US 12,800,489 B2
(45) Date of Patent: Nov. 17, 2026

(54) MEASURING APPARATUS, MEASURING METHOD, AND MEASURING PROGRAM

(71) Applicant: Kioxia Corporation, Tokyo (JP)

(72) Inventors: Kazuyuki Masukawa, Yokohama Kangawa (JP); Takuji Ohashi, Yokohama Kangawa (JP); Shutaro Otsuka, Yokohama Kangawa (JP); Ai Furubayashi, Yokohama Kangawa (JP); Toshiyuki Sasaki, Yokkaichi Mie (JP); Takaki Hashimoto, Yokohama Kangawa (JP)

(73) Assignee: Kioxia Corporation, Tokyo (JP)

( * ) Notice: Subject to any disclaimer, the term of this patent is extended or adjusted under 35 U.S.C. 154(b) by 75 days.

(21) Appl. No.: 19/073,731

(22) Filed: Mar. 7, 2025

(65) Prior Publication Data

US 2026/0002871 A1 Jan. 1, 2026

(30) Foreign Application Priority Data

Jun. 28, 2024 (JP) ................................ 2024-105354
Dec. 5, 2024 (JP) ................................ 2024-212392

(51) Int. Cl.
*G01N 21/41* (2006.01)
*G01N 21/35* (2014.01)
*G01N 21/3563* (2014.01)

(52) U.S. Cl.
CPC ......... *G01N 21/41* (2013.01); *G01N 21/3563* (2013.01); *G01N 2021/3568* (2013.01);
(Continued)

(58) Field of Classification Search
CPC ............... G01N 21/41; G01N 21/3563; G01N 2021/3568; G01N 2021/3595;
(Continued)

(56) References Cited

U.S. PATENT DOCUMENTS

2012/0063486 A1 3/2012 Yamawaku et al.
2013/0128275 A1 5/2013 Matsudo et al.
(Continued)

FOREIGN PATENT DOCUMENTS

JP 2010199526 A 9/2010
JP 2013029487 A 2/2013
(Continued)

OTHER PUBLICATIONS

Bae, et al., "Optical method for simultaneous thickness measurements of two layers with a significant thickness difference", Optics Express, vol. 29, No. 20, Sep. 2021, 31615.
(Continued)

*Primary Examiner* — Tony Ko
(74) *Attorney, Agent, or Firm* — Holtz, Holtz & Volek PC

(57) ABSTRACT

A measuring apparatus according to one embodiment includes a light source, a spectrometer, and a calculator. The light source emits measurement light. The spectrometer measures a spectroscopic spectrum waveform of light. The calculator is configured to: perform Fourier transform of the spectroscopic spectrum waveform; extract a waveform; calculate a phase angle at an amplitude peak position of the extracted waveform; calculate a temperature or thickness change amount based on the change amount of the phase angle; and calculate a temperature by adding the temperature change amount to a reference temperature, or calculate a thickness of the measurement target object by adding the thickness change amount to a reference thickness.

14 Claims, 22 Drawing Sheets

(52) U.S. Cl.
CPC ................ *G01N 2021/3595* (2013.01); *G01N 2021/4173* (2013.01)

(58) Field of Classification Search
CPC ........ G01N 2021/4173; G01B 11/0675; G01B 2210/56; G01B 11/0625; H10P 74/203; G01K 11/125
See application file for complete search history.

(56) References Cited

U.S. PATENT DOCUMENTS

| | | | |
|---|---|---|---|
| 2013/0314713 A1 | 11/2013 | Nagai | |
| 2018/0045541 A1 | 2/2018 | Pechstedt | |
| 2023/0349688 A1 | 11/2023 | Itoh et al. | |
| 2024/0264009 A1 | 8/2024 | Furubayashi et al. | |
| 2024/0290666 A1* | 8/2024 | Moriyama | H10P 50/283 |

FOREIGN PATENT DOCUMENTS

| | | |
|---|---|---|
| JP | 2023127323 A | 9/2023 |
| JP | 2024111669 A | 8/2024 |

OTHER PUBLICATIONS

Koshimizu, et al., "Simultaneous In situ Measurement of Silicon Substrate Temperature and Silicon Dioxide Film Thickness during Plasma Etching of Silicon Dioxide Using Low-Coherence Interferometry", Japanese Journal of Applied Physics, vol. 51, No. 4R, 046201, 2012.

Tsutsumi, et al., "Rapid measurement of substrate temperatures by frequency-domain low-coherence interferometry", App. Phys.Lett. 103, 182102,2023.

* cited by examiner

MEASURING APPARATUS, MEASURING METHOD, AND MEASURING PROGRAM

CROSS-REFERENCE TO RELATED APPLICATIONS

This application is based upon and claims the benefit of priority from Japanese Patent Application No. 2024-105354, filed Jun. 28, 2024, and Japanese Patent Application No. 2024-212392, filed Dec. 5, 2024, the entire contents of which are incorporated herein by reference.

FIELD

Embodiments described herein relate generally to a measuring apparatus, a measuring method, and a measuring program.

BACKGROUND

A method of measuring a wafer temperature using optical interference is known.

DETAILED DESCRIPTION

Figure 1:
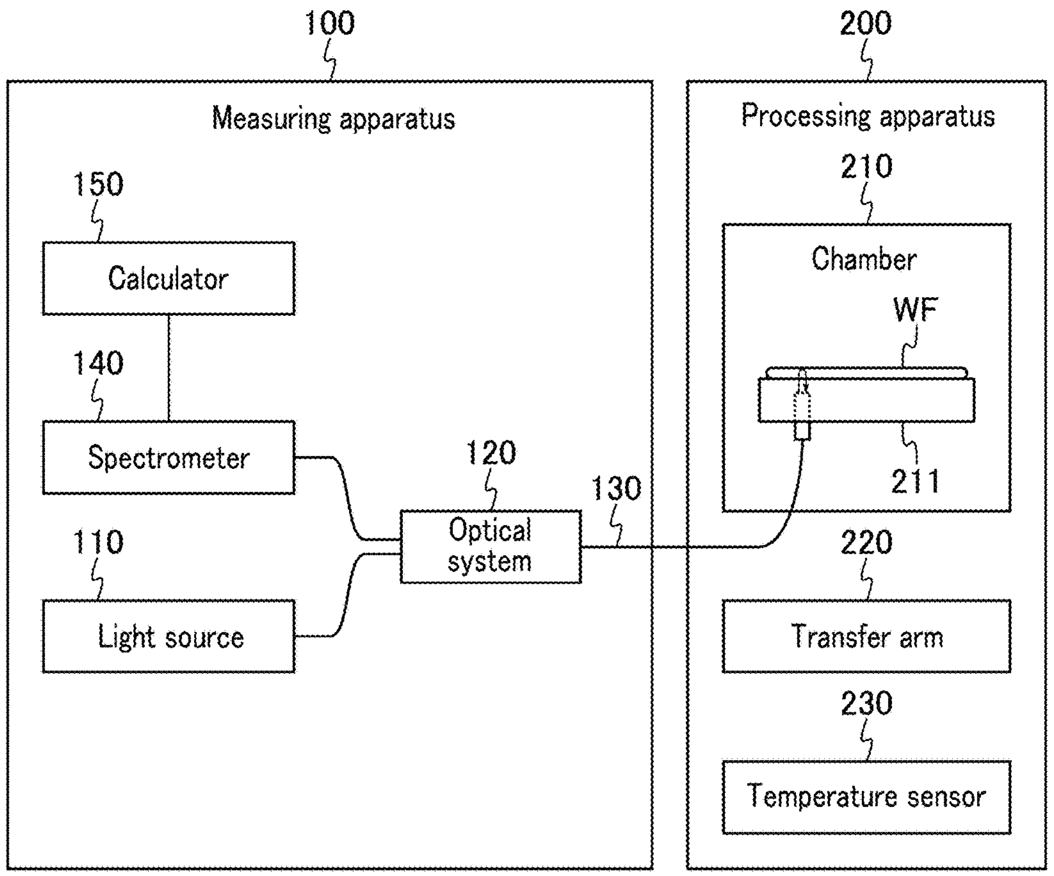
FIG. 1 is a block diagram illustrating an example of configurations of a measuring apparatus and a processing apparatus according to a first embodiment.

In general, according to one embodiment, a measuring apparatus includes a light source, a spectrometer, and a calculator. The light source is configured to emit measurement light having a wavelength that transmits through a measurement target object. The spectrometer is configured to measure a spectroscopic spectrum waveform of light generated by reflecting the measurement light from the measurement target object. The calculator is configured to: perform Fourier transform of the spectroscopic spectrum waveform; extract a waveform from a waveform obtained by the Fourier transform; calculate a phase angle at an amplitude peak position of the extracted waveform; calculate a temperature change amount or a thickness change amount of the measurement target object based on the change amount of the phase angle; and calculate a temperature of the measurement target object by adding the temperature change amount to a reference temperature, or calculate a thickness of the measurement target object by adding the thickness change amount to a reference thickness.

Each embodiment will be described below with reference to the drawings. Each embodiment exemplifies an apparatus and a method for embodying the technical idea of the invention. The drawings are schematic or conceptual. Dimensions, ratios, and the like of each drawing are not necessarily the same as actual ones. The illustration of the configuration is omitted as appropriate. In the present specification, components having substantially the same function and configuration are denoted by the same reference numerals. Numbers, characters, and the like added to reference numerals are referred to by the same reference numerals, and are used to distinguish between similar elements.

<1> First Embodiment

The measuring apparatus 100 according to a first embodiment uses a change amount of a phase angle of a complex amplitude based on an acquired interference spectrum in measurement of wafer temperature using optical interference. Hereinafter, the measuring apparatus 100 according to the first embodiment will be described in detail.

<1-1> Configurations

<1-1-1> Configurations of Measuring Apparatus 100 and Processing Apparatus 200

FIG. 1 is a block diagram illustrating an example of configurations of a measuring apparatus 100 and a processing apparatus 200 according to the first embodiment. Hereinafter, an example of a configuration of each of the measuring apparatus 100 and the processing apparatus 200 according to the first embodiment will be sequentially described with reference to FIG. 1.

(Configuration of Measuring Apparatus 100)

The measuring apparatus 100 is configured to measure wafer temperature using optical interference. A measurement target object of the measuring apparatus 100 is, for example, a semiconductor substrate such as a silicon wafer or a sapphire wafer. A silicon oxide film, a silicon nitride film, a pattern, and the like are provided on the wafer as a measurement target. The measuring apparatus 100 can measure the wafer temperature during a process (during processing) by the processing apparatus 200. The measuring apparatus 100 includes, for example, a light source 110, an optical system 120, a measurement probe 130, a spectrometer 140, and a calculator 150.

The light source 110 is configured to be capable of emitting measurement light. The wavelength of light generated by the light source 110 includes a wavelength that passes through a film of at least one layer included in the measurement object, and is, for example, equal to or more than 1 μm. As the light source 110, for example, an amplified spontaneous emission (ASE) light source or a super luminescent diode (SLD) light source is used.

The optical system 120 guides light (measurement light) incident from the light source 110 to the measurement probe 130. In addition, the optical system 120 guides light (interference light) incident from the measurement probe 130 to the spectrometer 140. The optical system 120 includes, for example, an optical coupler.

The measurement probe 130 is configured to irradiate a temperature measurement target with measurement light from the optical system 120 and capture interference light reflected from the measurement target. The interference light captured by the measurement probe 130 is guided to the optical system 120.

The spectrometer 140 measures an electromagnetic wave spectrum of the interference light incident from the optical system 120. Then, the spectrometer 140 outputs data of the measured electromagnetic wave spectrum to the calculator 150. The electromagnetic wave spectrum measured by the spectrometer 140 may be referred to as a "spectroscopic spectrum" or may be referred to as an "interference spectrum".

The calculator 150 calculates the temperature of the measurement target based on data of the interference spectrum received from the spectrometer 140 and an initial temperature of the measurement target. Details of a method of measuring the temperature using the interference spectrum by the calculator 150 will be described later.

(Configuration of Processing Apparatus 200)

The processing apparatus 200 is an apparatus that executes a predetermined semiconductor manufacturing process on a wafer. The predetermined semiconductor manufacturing process is, for example, an etching process, a film forming process, or the like. The processing apparatus 200 includes, for example, a chamber 210, a transfer arm 220, and a temperature sensor 230.

The chamber 210 is, for example, a sealed reaction vessel for causing physical and scientific reactions to a wafer WF. A wafer stage 211 is disposed in the chamber 210. A wafer WF to be processed can be arranged on the wafer stage 211. The measurement probe 130 of the measuring apparatus 100 is connected to the wafer stage 211 so as to be able to irradiate the wafer WF, which is a temperature measurement target, with light. The wafer WF as a measurement target for temperature includes, for example, the wafer WF to be processed.

The transfer arm 220 has a function of transferring the wafer WF in the processing apparatus 200. The wafer WF can be taken in and out of the chamber 210 by the transfer arm 220. Although not illustrated, the temperature sensor 230 is connected to the wafer stage 211. The temperature sensor 230 directly measures the temperature of the wafer stage 211.

Note that the processing apparatus 200 may include a temperature sensor in addition to the temperature sensor 230 connected to the wafer stage 211. For example, the processing apparatus 200 may include a temperature sensor for measuring the temperature of the wafer WF held by the transfer arm 220. In addition, the processing apparatus 200 may include a dedicated thermostatic chamber on which a temperature sensor is mounted in order to measure the temperature of the wafer WF. The type of temperature sensor to be mounted may be different depending on a place to be used.

<1-1-2> Configuration of Calculator 150

Figure 2:
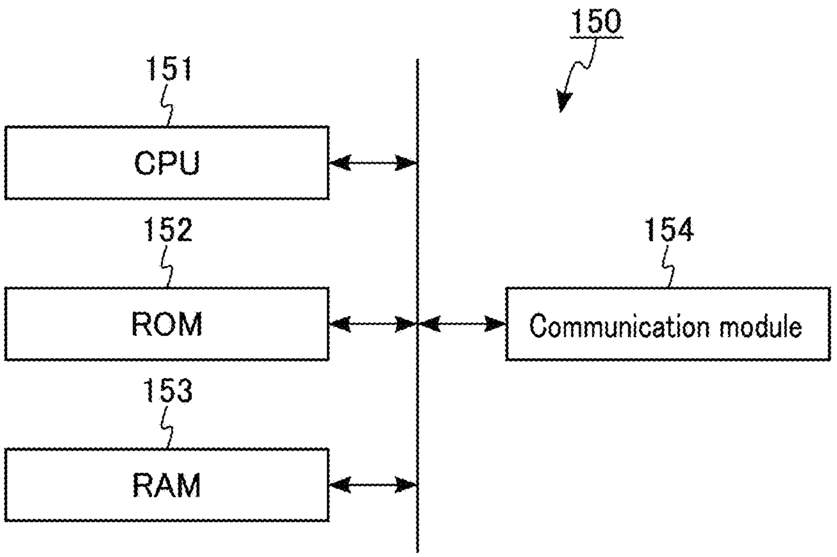
FIG. 2 is a block diagram illustrating an example of a configuration of a computer included in the measuring apparatus according to the first embodiment.

FIG. 2 is a block diagram illustrating an example of a configuration of a calculator 150 included in the measuring apparatus 100 according to the first embodiment. As illustrated in FIG. 2, the calculator 150 includes, for example, a central processing unit (CPU) 151, a read only memory (ROM) 152, a random access memory (RAM) 153, and a communication module 154.

The CPU 151 is a processor capable of executing various programs including a measurement program, and controls the entire operation of the calculator 150. The ROM 152 is, for example, a nonvolatile semiconductor memory, and stores a program for controlling the calculator 150, the measurement program, control data, and the like. The measurement program is a computer program for measuring the temperature or thickness of the measurement target object and is executed on a calculator 150 which is configured as a computer. The RAM 153 is, for example, a volatile semiconductor memory, and is used as a work area of the CPU 151. The communication module 154 is a communication circuit configured to be able to receive the data of the interference spectrum acquired by the spectrometer 140.

Note that the calculator 150 may include a storage device for storing temperature information obtained by the measurement processing. The calculator 150 may be prepared independently of the measuring apparatus 100. That is, the calculator 150 may be externally connected. The function as the calculator 150 can be implemented by a program. Instead of the CPU 151, a micro processing unit (MPU), an application specific integrated circuit (ASIC), a field-programmable gate array (FPGA), or the like may be used. In the processing described in the above embodiment, processing executed by software and processing executed by hardware may be mixed, or only one of them may be used.

<1-1-3> Configuration of Chamber 210

Figure 3:
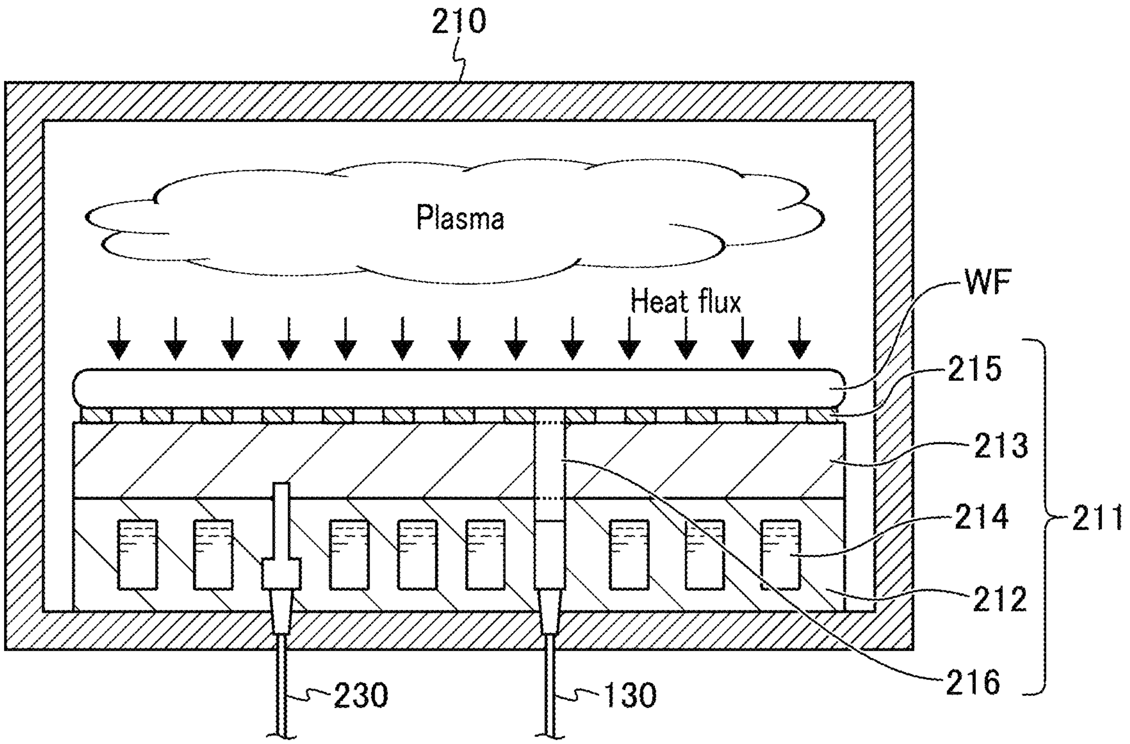
FIG. 3 is a schematic diagram illustrating an example of a configuration of a chamber included in the processing apparatus according to the first embodiment.

FIG. 3 is a schematic diagram illustrating an example of a configuration of a chamber 210 included in the processing apparatus 200 according to the first embodiment. FIG. 3 illustrates a state in which the processing apparatus 200 is an etching apparatus and is in process (for example, during etching) on the wafer WF. As illustrated in FIG. 3, the wafer stage 211 disposed in the chamber 210 includes, for example, a support base 212 and an electric static chuck (ESC) 213.

The support base 212 supports the electric static chuck 213. The support base 212 has a refrigerant flow path, and is configured to be capable of adjusting the temperature by a refrigerant 214 included in the refrigerant flow path. The temperature of the refrigerant 214 can be controlled by a chiller. A temperature sensor 230 is installed under the support base 212. For example, the temperature sensor 230 is disposed to directly measure the temperature of the electric static chuck 213.

The electric static chuck 213 is configured to be capable of chucking (fixing) the wafer WF. A plurality of pins 215 is disposed on the electric static chuck 213. When the electric static chuck 213 chucks the wafer WF, the plurality of pins 215 support the bottom surface of the wafer WF. Further, the electric static chuck 213 has an observation window 216. The observation window 216 is configured to transmit infrared light, for example. The measurement probe 130 of the measuring apparatus 100 is arranged in the observation window 216. The measurement probe 130 can irradiate a back surface of the wafer WF with measurement light via the observation window 216 and capture interference light reflected from the wafer WF.

The transfer arm 220 can transfer the wafer WF to be measured for temperature on the electric static chuck 213. The electric static chuck 213 can chuck the wafer WF by receiving charge supply from plasma generated in the chamber 210 and charging the wafer WF. During etching, the wafer WF is heated by receiving heat flux from the plasma. The heat generated in the wafer WF may move to the electric static chuck 213. The wafer stage 211 may be configured to be able to supply helium gas for cooling the wafer WF between the wafer WF and the electric static chuck 213 when the electric static chuck 213 chucks the wafer WF. In this case, the wafer WF can be cooled by helium gas filled between the wafer WF and the electric static chuck 213. The temperature of the refrigerant 214 can be controlled based on the temperature of the electric static chuck 213 measured by the temperature sensor 230 in such a manner that the temperature of the electric static chuck 213 is constant.

(Relationship Between Wafer Temperature and ESC Temperature)

Figure 4:
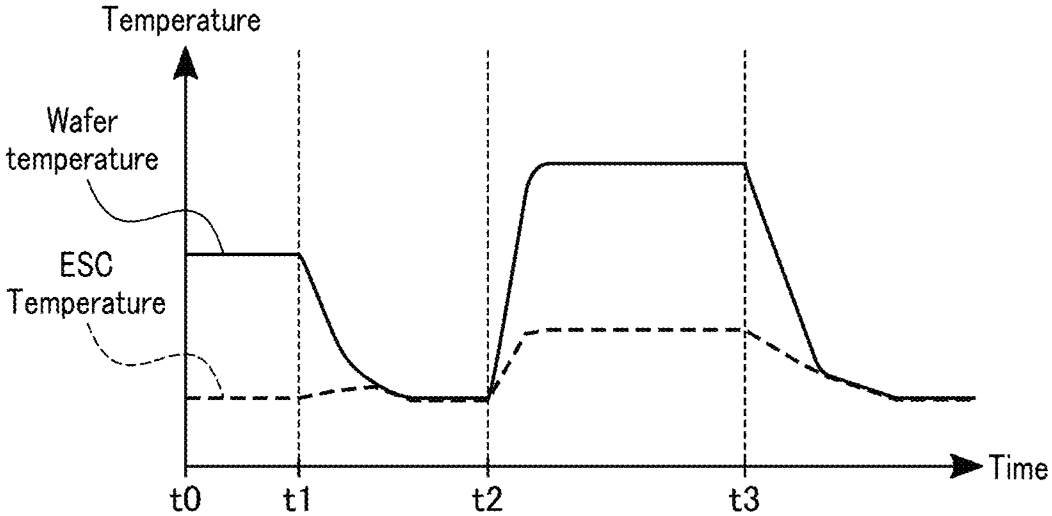
FIG. 4 is a time chart illustrating an example of behavior of a wafer temperature and an ESC temperature during a process by the processing apparatus according to the first embodiment.

FIG. 4 is a time chart illustrating an example of behavior of the wafer temperature and the ESC temperature during the process by the processing apparatus 200 according to the first embodiment. The wafer temperature corresponds to the temperature of the wafer WF during the process by the processing apparatus 200. The ESC temperature corresponds to the temperature of the electric static chuck 213 measured by the temperature sensor 230. Hereinafter, an example of behavior of the wafer temperature and the ESC temperature during the process will be described with reference to FIG. 4.

Time to corresponds to the time when the wafer WF is transferred into the chamber 210. At time to, the wafer WF and the electric static chuck 213 are not in contact with each other. Thus, at time to, each of the wafer temperature and the ESC temperature maintains an initial temperature. For example, the wafer initial temperature is higher than the ESC initial temperature.

Thereafter, at time t1, the wafer WF is chucked by the electric static chuck 213, and a helium gas for cooling flows between the wafer WF and the electric static chuck 213. Then, each of the wafer temperature and the ESC temperature approaches and eventually coincides. Moreover, when the time further elapses, the temperature of the electric static chuck 213 is controlled by the refrigerant 214, and thus each of the wafer temperature and the ESC temperature decreases to the ESC initial temperature.

Thereafter, at time t2, plasma for etching is turned on. Then, the wafer WF is heated by heat flux from the plasma, and the wafer temperature rises. At this time, the ESC temperature also rises due to the heat transferred from the wafer WF. On the other hand, the wafer temperature and the ESC temperature are separated from each other, and the wafer temperature becomes higher than the ESC temperature.

Thereafter, at time t3, the plasma is turned off. Then, since the heat flux from the plasma is interrupted, each of the wafer temperature and the ESC temperature decreases. Then, each of the wafer temperature and the ESC temperature approaches and eventually coincides. As the time further elapses, each of the wafer temperature and the ESC temperature decreases to the ESC initial temperature.

As described above, the wafer temperature and the ESC temperature may deviate from each other during the process by the processing apparatus 200. Then, the process by the processing apparatus 200 may have dependency on the wafer temperature. Thus, in order to improve the stability of the process by the processing apparatus 200, it is more preferable to directly measure and manage the wafer temperature.

Note that FIG. 4 illustrates a case where there is a time during which the wafer temperature and the ESC temperature coincide with each other during the process, but the embodiment is not limited thereto. For example, in a case where weak plasma is generated for supplying electric charges for a wafer chuck in a period between time t1 and time t2, weak heat flux flows in, and the wafer WF is weakly heated. In this case, in the period between time t1 and time t2, although the wafer temperature approaches the ESC temperature, the wafer temperature and the ESC temperature do not coincide with each other and can be maintained in a close state.

<1-2> Principle

Hereinafter, an example of the principle of temperature measurement using optical interference will be described. Note that, in the present specification, a "substrate proximity layer" is defined as a layer in which the optical thickness from a substrate surface is thinner than half of an optical path length spread of planar Gaussian as illustrated in (B) of FIG. 15 described later. The substrate proximity layer may be a single layer, or may include a plurality of layers in which the total optical thickness satisfies the above condition. The substrate proximity layer may include not only a layer constituted by a substance but also a vacuum layer and an air gap. The substrate proximity layer may be generated not only on the front surface but also on the back surface of the substrate. Among the substrate proximity layers, those that become disturbance are layers whose optical thicknesses change during the process.

First Example

In the first example, a case where the wafer WF as a measurement target is a single layer and temperature measurement is executed based on a peak position of a complex amplitude will be described.

Figure 5:
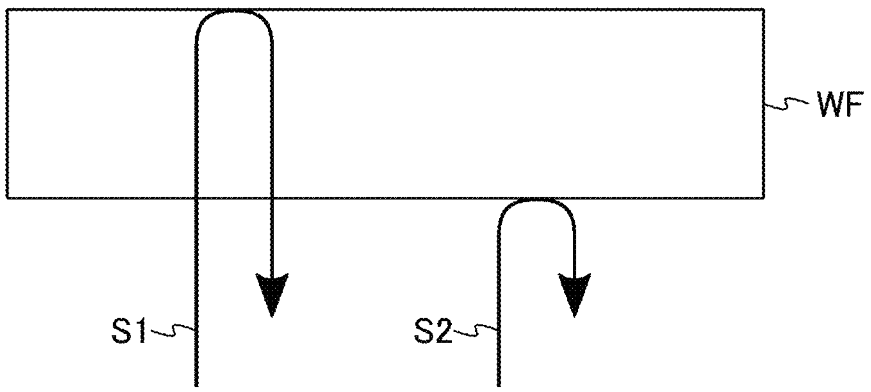
FIG. 5 is a diagram illustrating an example of a component of interference light in a case where a wafer as a measurement target is a single layer.
Figure 6:
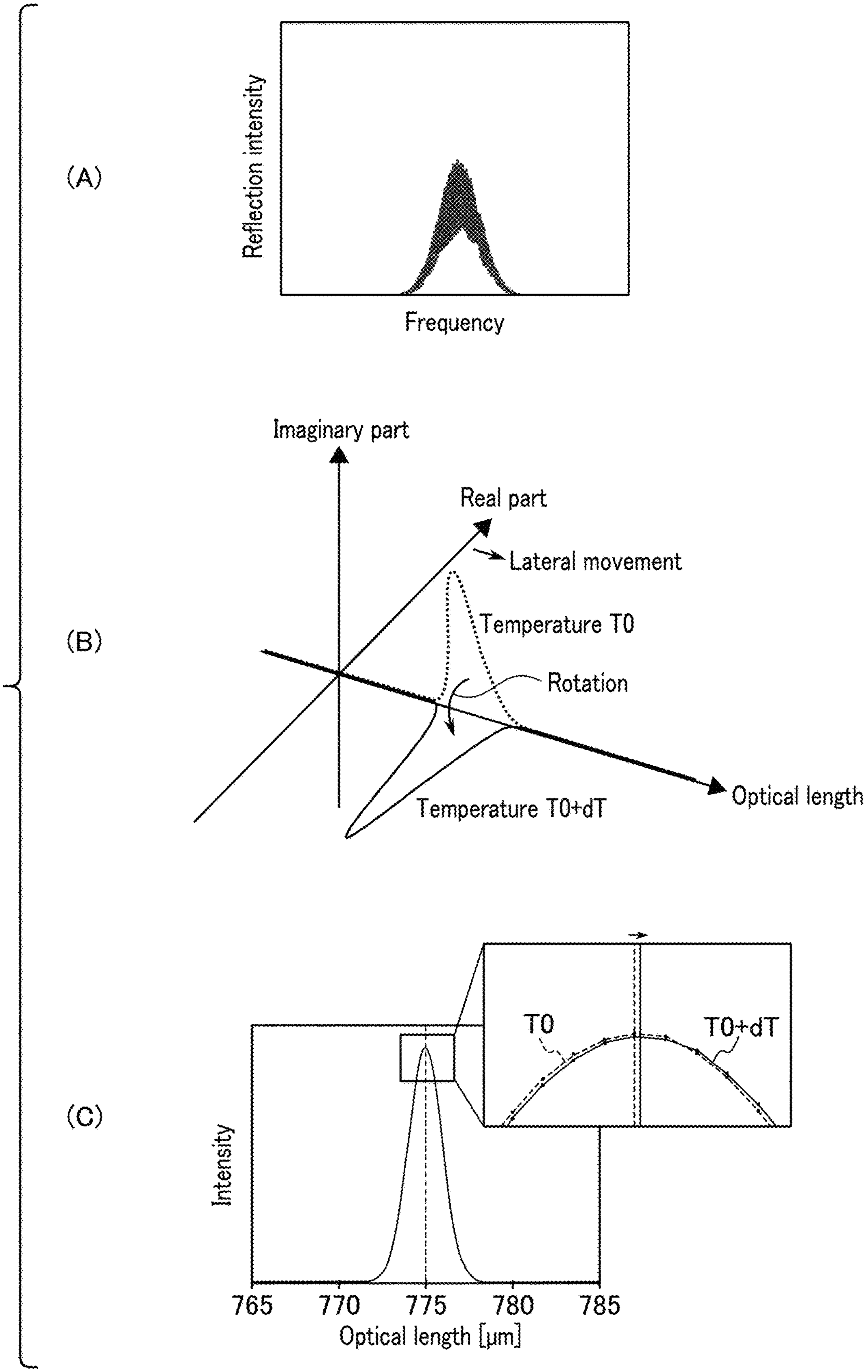
FIG. 6 is a diagram illustrating an outline of wafer temperature measurement using optical interference in a first example.

FIG. 5 is a diagram illustrating an example of a component of interference light in a case where the wafer WF as a measurement target is a single layer. As illustrated in FIG. 5, in the present example, the wafer WF is a single-layer silicon substrate and does not have a substrate proximity layer. At this time, the interference light is formed by interference between a signal component S1 and a signal component S2. The signal component S1 corresponds to reflected light from the surface of the wafer WF. The signal component S2 corresponds to reflected light from the back surface of the wafer WF. FIG. 6 is a diagram illustrating an outline of wafer temperature measurement using optical interference in the first example. (A) of FIG. 6 illustrates an interference spectrum measured by the spectrometer 140. In a graph illustrated in (A) of FIG. 6, the horizontal axis indicates frequency, and the vertical axis indicates reflection intensity. (B) of FIG. 6 is a waveform after Fourier transform or inverse Fourier transform of the interference spectrum illustrated in (A) of FIG. 6. Three axes of the graph illustrated in (B) of FIG. 6 indicate an optical path length [μm], a real part, and an imaginary part, respectively. The real part and the imaginary part indicate complex amplitudes based on the interference spectrum. (C) of FIG. 6 is a waveform obtained by calculating the absolute value of intensity of the interference spectrum after the Fourier transform illustrated in (B) of FIG. 6. In a graph illustrated in (C) of FIG. 6, the horizontal axis indicates the optical path length [μm], and the vertical axis indicates the intensity (absolute value of complex amplitude).

FIG. 6 illustrates a case where the wafer temperature measurement is executed on the single-layer wafer WF illustrated in FIG. 5 based on the peak position of the complex amplitude. If spectrometry is performed on interference light obtained by irradiating the wafer WF as a measurement target with measurement light, an interference spectrum as illustrated in (A) of FIG. 6 is obtained at a certain time. If the Fourier transform is performed on this interference spectrum, a waveform (complex amplitude data) indicated by a broken line in (B) of FIG. 6 is obtained. In this example, the wafer temperature when this waveform is acquired is T0. If the wafer temperature changes from T0 to T0+dT, the waveform laterally moves along the axis of the optical path length while rotating clockwise around the axis of the optical path length accompanying thermal expansion or a change in refractive index of the wafer WF. As a result, as illustrated in (C) of FIG. 6, the peak position of the complex amplitude based on the interference spectrum changes. As described above, the change amount of the peak position of the complex amplitude has a proportional relationship with the change amount dT of the wafer temperature. Thus, the change amount dT of the wafer temperature can be calculated based on the change amount of the peak position of the complex amplitude.

Second Example

In the second example, a case where the wafer WF as a measurement target has a proximity layer and temperature measurement is executed based on the peak position of the complex amplitude will be described.

Figure 7:
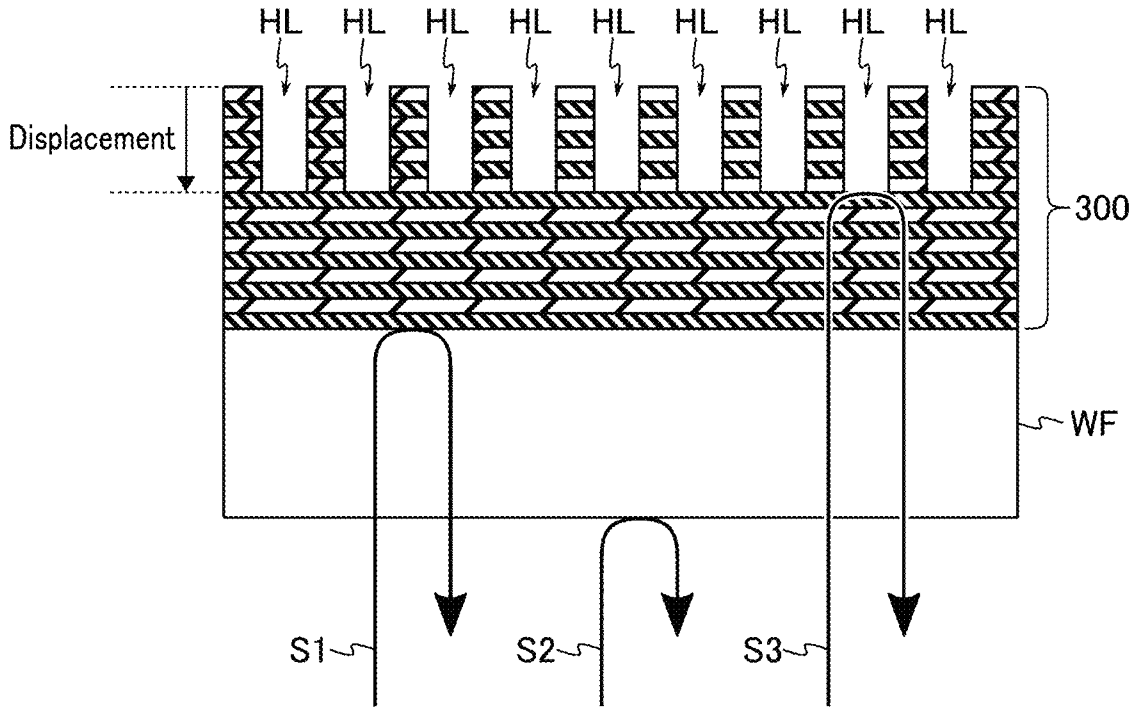
FIG. 7 is a diagram illustrating an example of a component of interference light in a case where the wafer as a measurement target has a proximity layer.

FIG. 7 is a diagram illustrating an example of a component of interference light in a case where the wafer WF as a measurement target has a proximity layer. As illustrated in FIG. 7, in the present example, a proximity layer 300 is formed on the wafer WF. The proximity layer 300 has, for example, a structure in which two types of members are alternately stacked. The proximity layer 300 may be, for example, a single layer. In the present example, a plurality of holes HL is formed in the proximity layer 300 by a process by the processing apparatus 200. That is, the position of the bottom of each hole HL changes during the process in the processing apparatus 200. In this case, the interference light is formed by the signal component S1, the signal component S2, and a noise component S3 interfering with each other. Each of the signal components S1 and S2 is similar to the content described in the first example. The noise component S3 corresponds to reflected light from the bottoms of the plurality of holes HL where displacement occurs during the process in the processing apparatus 200. Hereinafter, a signal component obtained by combining the signal components S1 and S2 is referred to as a signal component SC, and the noise component S3 is referred to as a noise component NC.

Figure 8:
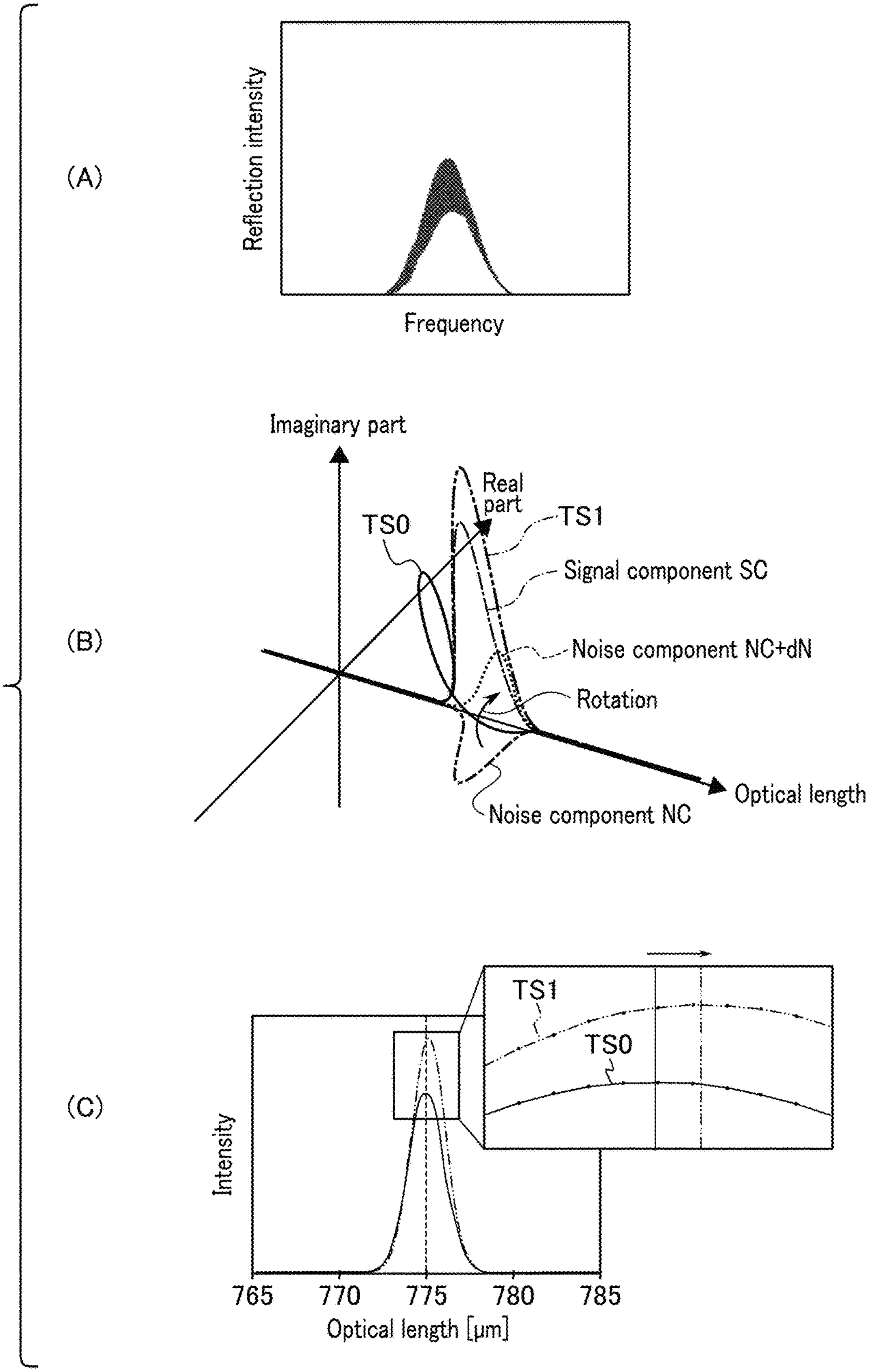
FIG. 8 is a diagram illustrating an outline of wafer temperature measurement using optical interference in a second example.

FIG. 8 is a diagram illustrating an outline of a method of measuring a wafer temperature using optical interference in a second example. (A) of FIG. 8 illustrates an interference spectrum measured by the spectrometer 140. In a graph illustrated in (A) of FIG. 8, the horizontal axis indicates frequency, and the vertical axis indicates reflection intensity. (B) of FIG. 8 is a waveform after Fourier transform or inverse Fourier transform of the interference spectrum illustrated in (A) of FIG. 8. Three axes of the graph illustrated in (B) of FIG. 8 indicate an optical path length [μm], a real part, and an imaginary part, respectively. The real part and the imaginary part indicate complex amplitudes based on the interference spectrum. (C) of FIG. 8 is a waveform obtained by calculating the absolute value of intensity of the interference spectrum after the Fourier transform illustrated in (B) of FIG. 8. In the graph illustrated in (C) of FIG. 8, the horizontal axis indicates the optical path length [μm], and the vertical axis indicates the intensity (absolute value of complex amplitude).

FIG. 8 illustrates a case where temperature measurement based on the peak position of the complex amplitude is executed on the wafer WF having the proximity layer 300 illustrated in FIG. 7 by a method similar to the first example, and only the noise component changes at the same temperature. If spectrometry is performed on interference light obtained by irradiating the wafer WF as a measurement target with measurement light, an interference spectrum as illustrated in (A) of FIG. 8 is obtained at a certain time. If the Fourier transform is performed on this interference spectrum, an observation signal TS0 indicated by a solid line in (B) of FIG. 8 is obtained. The observation signal TS0 corresponds to a waveform in which the signal component SC indicated by a one-dot chain line and the noise component NC are combined.

As the process in the processing apparatus 200 proceeds, the noise component NC changes to NC+dN indicated by a broken line accompanying a change in the structure of the proximity layer 300. If the noise component NC changes to NC+dN under the same temperature condition, an observation signal TS1 indicated by a two-dot chain line is obtained. The observation signal TS1 corresponds to a waveform in which the signal component SC and the noise component NC+dN are combined. Respective peak positions of the observation signals TS0 and TS1 are shifted as illustrated in (C) of FIG. 8. As described above, even in a case where the wafer temperature does not change, the peak position of the observation signal TS can laterally move along the axis of the optical path length according to the change in the proximity layer 300. That is, in the temperature measurement based on the peak position of the complex amplitude, an error in the measured temperature may occur based on a change in the noise component NC.

First Embodiment

On the other hand, the measuring apparatus 100 according to the first embodiment executes temperature measurement based on the phase angle of the complex amplitude in addition to the principle described in the first example and the second example. Hereinafter, the principle of temperature measurement based on the phase angle in the measuring apparatus 100 according to the first embodiment will be described.

Figure 9:
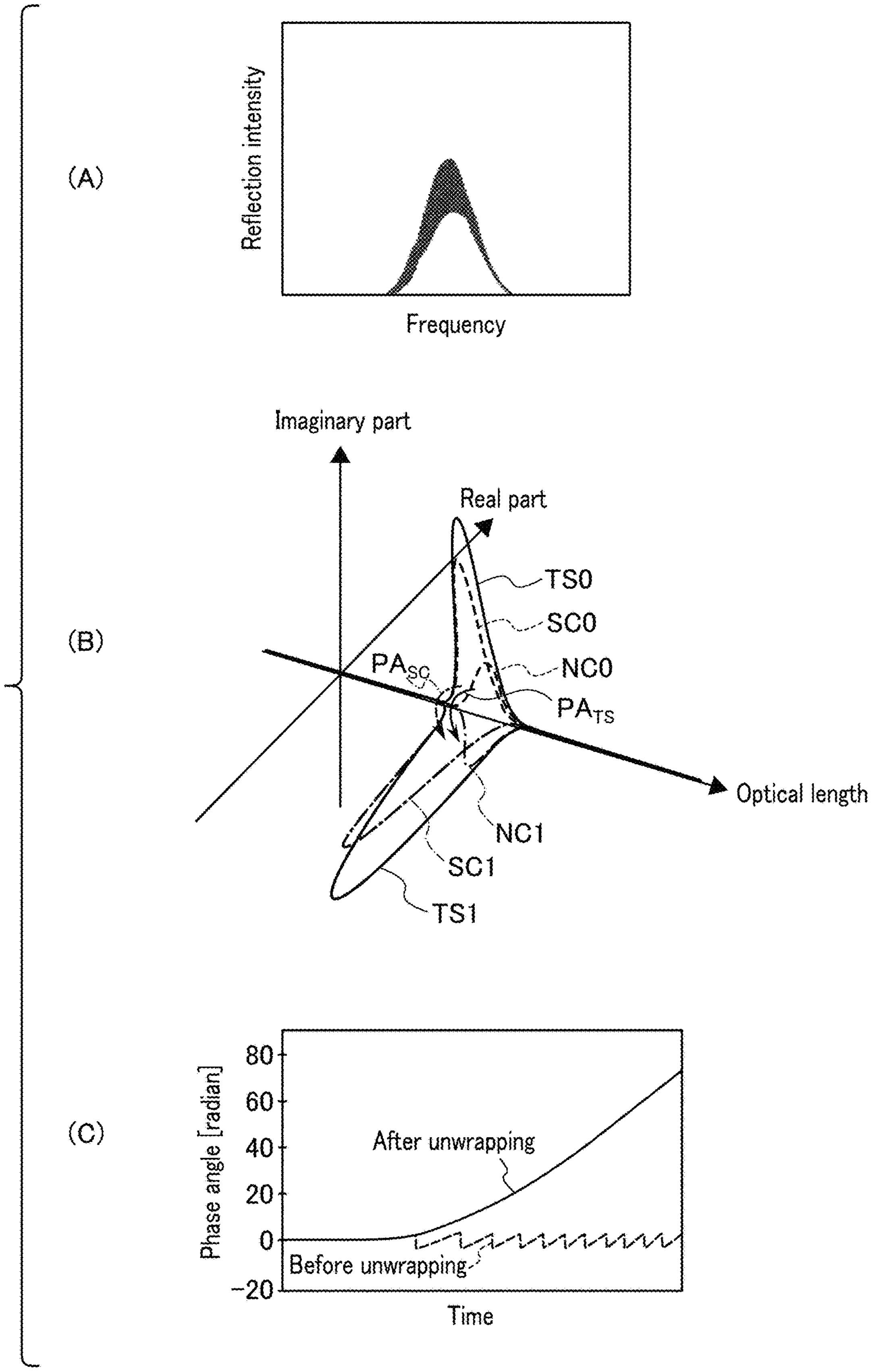
FIG. 9 is a diagram illustrating an outline of a method of measuring a wafer temperature using optical interference by the measuring apparatus according to the first embodiment.

FIG. 9 is a diagram illustrating an outline of a method of measuring a wafer temperature using optical interference by the measuring apparatus 100 according to the first embodiment. (A) of FIG. 9 illustrates an interference spectrum measured by the spectrometer 140. In the graph illustrated in (A) of FIG. 9, the horizontal axis indicates frequency, and the vertical axis indicates reflection intensity. (B) of FIG. 9 is a waveform after Fourier transform and phase angle extraction of the interference spectrum illustrated in (A) of FIG. 9. Three axes of the graph illustrated in (B) of FIG. 9 indicate an optical path length [μm], a real part, and an imaginary part, respectively. The real part and the imaginary part indicate complex amplitudes based on the interference spectrum. (C) of FIG. 9 illustrates a change in the phase angle of the interference spectrum after the Fourier transform illustrated in (B) of FIG. 9. In the graph illustrated in (C) of FIG. 9, the horizontal axis indicates time and the vertical axis indicates the phase angle [radian].

FIG. 9 illustrates a case where a temperature change occurs during the process for the wafer WF having the proximity layer 300 illustrated in FIG. 7. If spectrometry is performed on interference light obtained by irradiating the wafer WF as a measurement target with measurement light, an interference spectrum as illustrated in (A) of FIG. 9 is obtained at a certain time. If the Fourier transform is performed on this interference spectrum, an observation signal TS0 indicated by a solid line in (B) of FIG. 9 is obtained. The observation signal TS0 corresponds to a waveform in which the signal component SC0 and the noise component NC0 indicated by a broken line are combined.

Then, as the process in the processing apparatus 200 proceeds, the signal component changes to SC1 and the noise component changes to NC1 accompanying the change in the structure of the proximity layer 300. The observation signal TS1 corresponds to a waveform in which the signal component SC1 and the noise component NC1 indicated by a wo-dot chain line are combined. At this time, a change amount $PA_{SC}$ of the phase angle between the signal components SC0 and SC1 is substantially the same as a change amount $PA_{TS}$ of the phase angle between the observation signals TS0 and TS1. That is, the influence of the noise component NC on the change amount of the phase angle with respect to the observation signal is negligibly small. The sensitivity to temperature is higher in the temperature measurement based on the phase angle than in the temperature measurement based on the peak position.

Thus, the measuring apparatus 100 according to the first embodiment derives the change amount of the wafer temperature by focusing on the correlation between the change amount of the phase angle of the observation signal TS and the change amount of the wafer temperature. Note that, as indicated by a broken line in part (C) of FIG. 9, the phase angle returns to $-\pi$ with a period of $2\pi$ (before unwrapping). Thus, the calculator 150 executes unwrapping processing (phase recovery processing) of the phase angle in order to derive an accurate change amount of the phase angle. As a result, as indicated by the solid line in (C) of FIG. 9, the calculator 150 can know the continuous change amount of the phase angle. Thus, the measuring apparatus 100 according to the first embodiment can calculate the change amount of the wafer temperature based on the change amount of the phase angle by measuring and calculating the phase angle for each measurement time.

<1-3> Measuring Method

Hereinafter, as a method of manufacturing a semiconductor device, a specific example of a method of measuring a wafer temperature by the measuring apparatus 100 according to the first embodiment will be described.

<1-3-1> Preliminary Preparation

Figure 10:
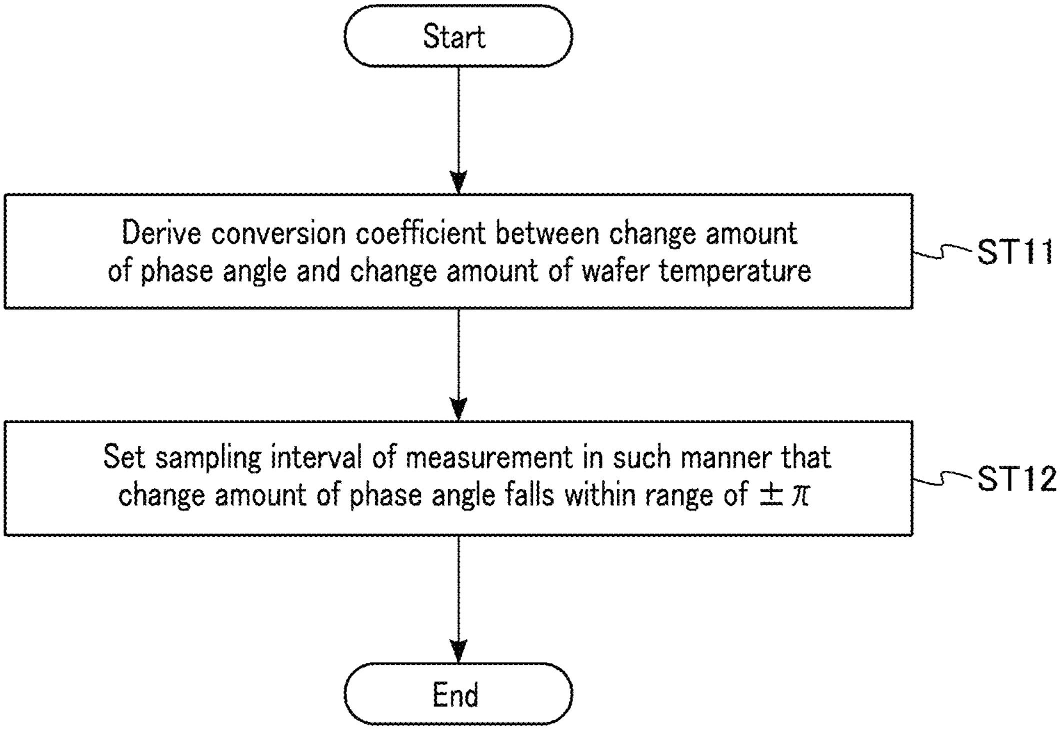
FIG. 10 is a flowchart illustrating an example of preliminary preparation for measurement processing by the measuring apparatus according to the first embodiment.

FIG. 10 is a flowchart illustrating an example of preliminary preparation for measurement processing by the measuring apparatus 100 according to the first embodiment. As illustrated in FIG. 10, in the preliminary preparation, the processing of steps ST11 and ST12 is sequentially executed.

(Step ST11)

In step ST11, a conversion coefficient between the change amount of the phase angle and the change amount of the wafer temperature is derived. In other words, the calculator 150 calculates a calibration line between the change amount of the phase angle and the wafer temperature. The conversion coefficient between the change amount of the phase angle and the change amount of the wafer temperature may be derived by, for example, an experiment. The conversion coefficient between the change amount of the phase angle and the change amount of the wafer temperature may be calculated by simulation using information such as an accurate optical coefficient and a wafer thickness. Note that the conversion coefficient may be calculated by the measuring apparatus 100, or the conversion coefficient calculated by an external device may be used by the measuring apparatus 100.

(Step ST12)

In step ST12, a sampling interval for measuring the wafer temperature is set in such a manner that the change amount of the phase angle falls within the range of $\pm\pi$. In other words, a sampling period in which the spectrometer 140 measures the interference spectrum waveform is set in such a manner that the change amount of the phase angle falls within the range of ±π in two consecutive samplings. By setting the change amount of the phase angle to fall within the range of ±π, continuity of the phase angle in the unwrapping processing is guaranteed.

<1-3-2> Measurement Processing

Figure 11:
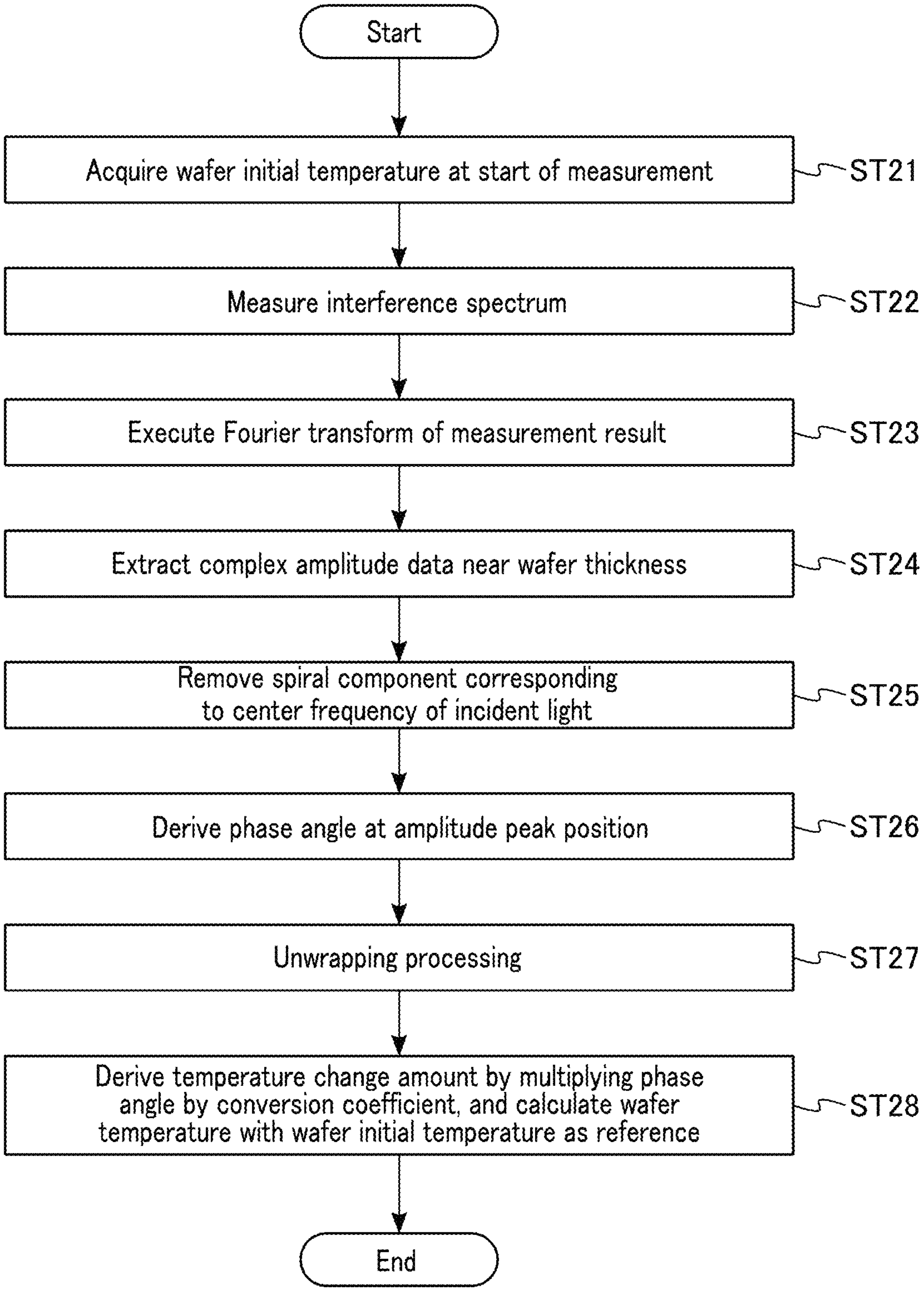
FIG. 11 is a flowchart illustrating an example of measurement processing by the measuring apparatus according to the first embodiment.

FIG. 11 is a flowchart illustrating an example of measurement processing by the measuring apparatus 100 according to the first embodiment. As illustrated in FIG. 11, in the measurement processing, processing of steps ST21 to ST28 is sequentially executed. Note that the measurement processing is executed at predetermined sampling intervals during the process of the measurement target object, that is, in a state where the structure of the measurement target object changes. That is, for example, the wafer WF to be processed by the processing apparatus 200 is the measurement target object.

(Step ST21)

In step ST21, the calculator 150 of the measuring apparatus 100 acquires the wafer initial temperature at the start of measurement from the processing apparatus 200. In the method of measuring the wafer temperature in the first embodiment, the change amount of the wafer temperature is calculated. Thus, in order to calculate the wafer temperature, it is required to acquire the wafer temperature at a certain point of time as a reference by another method. Note that the calculator 150 need not use the temperature at the process start time as the wafer initial temperature, and may use the wafer temperature at any time. Hereinafter, a first method and a second method will be described as specific examples of the method of measuring the wafer initial temperature.

In the first method, the relationship between the wafer temperature and the ESC temperature during the process as illustrated in FIG. 4 is obtained in advance, and the ESC temperature at the time when the wafer temperature matches or approaches the ESC temperature is set as the wafer initial temperature. For example, the calculator 150 sets the ESC temperature acquired by the temperature sensor 230 as the wafer temperature when a certain period of time has elapsed from time t1 (chuck and start inflow of helium gas for cooling) illustrated in FIG. 4 and the wafer temperature matches the ESC temperature. Alternatively, the calculator 150 may set the ESC temperature acquired by the temperature sensor 230 as the wafer initial temperature and update the measurement value when a certain period of time has elapsed from time t3 (plasma off) illustrated in FIG. 4 and the wafer temperature and the ESC temperature match or approach each other.

In the second method, the wafer temperature is measured at another place in the processing apparatus 200 before the wafer is transferred to the chamber 210, and the measured temperature is set as the wafer initial temperature. Another location may be a temperature-controlled thermostatic chamber or on the transfer arm 220. In the wafer temperature measurement in the thermostatic chamber or the transfer arm, since there is no high-pressure high-frequency electric field used for plasma generation, for example, a simple temperature measuring method such as a thermocouple may be used.

(Step ST22)

Figure 12:
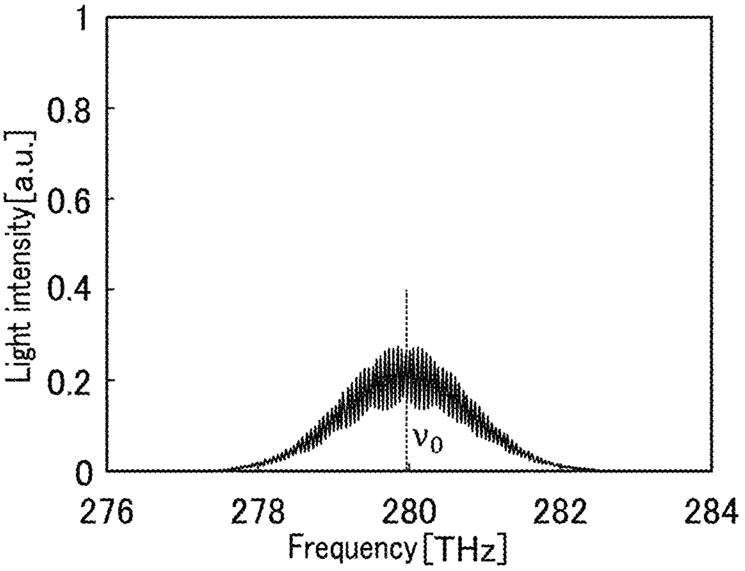
FIG. 12 is a diagram illustrating an example of a spectroscopic spectrum measured by the measuring apparatus according to the first embodiment.

In step ST22, the spectrometer 140 of the measuring apparatus 100 measures an interference spectrum. FIG. 12 is a diagram illustrating an example of an interference spectrum measured by the measuring apparatus 100 according to the first embodiment. The horizontal axis of the graph indicates frequency [THz], and the vertical axis of the graph indicates light intensity [a. u.]. If light in which reflected light from the upper layer and the lower layer of the wafer WF interferes is input to the spectrometer 140, the spectrometer 140 can measure an interference spectrum as illustrated in FIG. 12. $\nu_0$ illustrated in FIG. 12 corresponds to the center frequency of the interference light.

(Step ST23)

Figure 13:
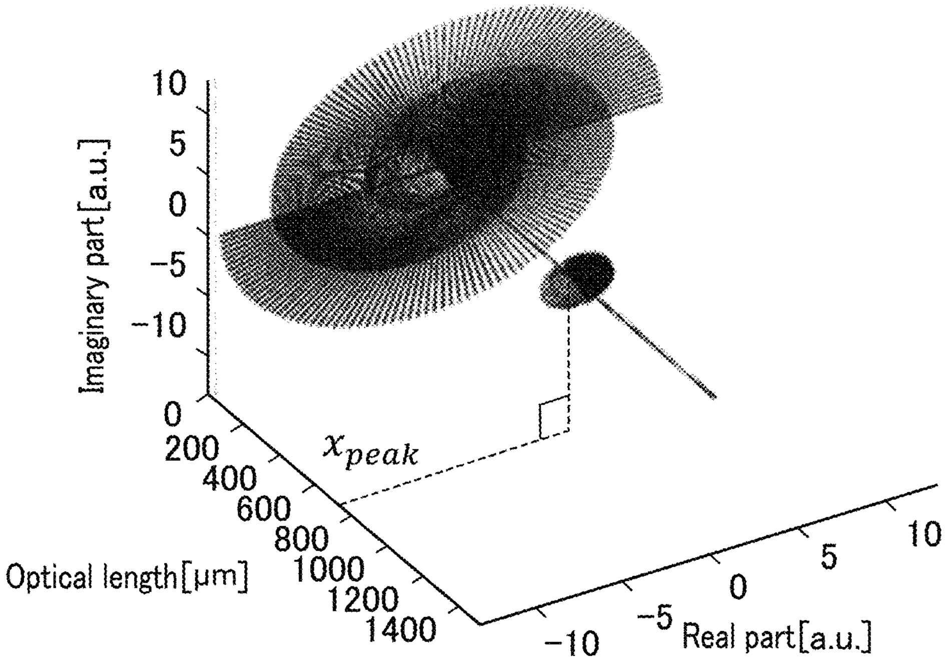
FIG. 13 is a diagram illustrating an example of a complex amplitude obtained by Fourier transform of the measuring apparatus according to the first embodiment.

In step ST23, the calculator 150 of the measuring apparatus 100 executes Fourier transform of the measurement result. Specifically, the calculator 150 performs zero fill processing on the interference spectrum on which the interpolation processing has been performed, and executes Fourier transform. FIG. 13 is a diagram illustrating an example of a complex amplitude obtained by Fourier transform of the measuring apparatus 100 according to the first embodiment. Three axes of the graph indicate an optical path length [μm], a real part [a. u.], and an imaginary part [a. u.], respectively. As illustrated in FIG. 13, the calculator 150 can obtain complex amplitude data including complex numbers based on the acquired interference spectrum in step ST23. At this point, the complex amplitude data includes a spiral component. Note that $x_{peak}$ illustrated in FIG. 13 indicates an optical path length corresponding to the peak of the thickness of the wafer WF.

(Step ST24)

Figure 14:
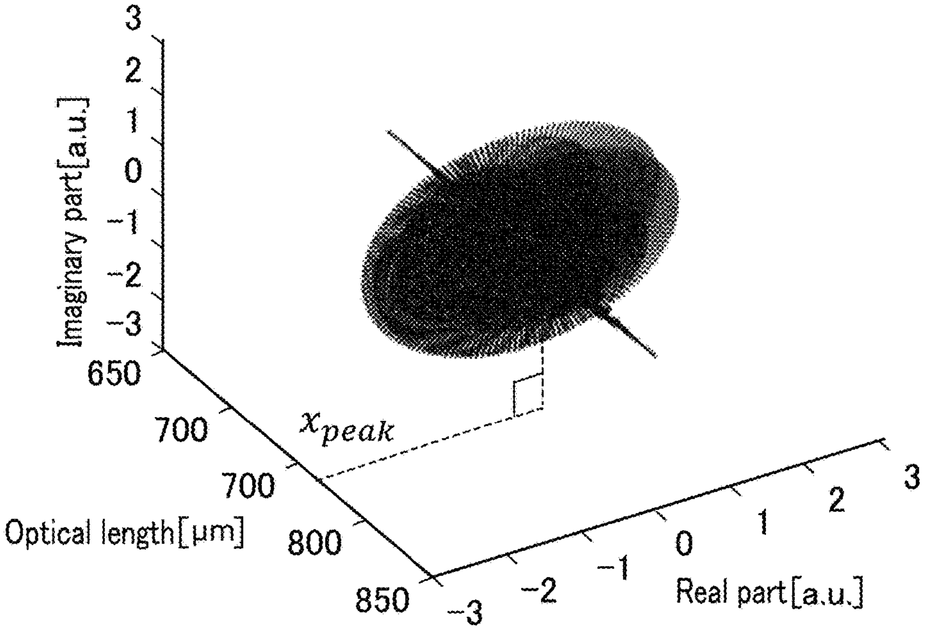
FIG. 14 is a diagram illustrating an example of the complex amplitude near a wafer thickness extracted by the measuring apparatus according to the first embodiment.

In step ST24, the calculator 150 of the measuring apparatus 100 extracts (cuts out) complex amplitude data near the wafer thickness. That is, the waveform around the frequency corresponding to the wafer thickness is extracted from the Fourier-transformed waveform. The thickness of the 300 mm silicon wafer is, for example, about 750 μm. FIG. 14 is a diagram illustrating an example of the complex amplitude near the wafer thickness extracted by the measuring apparatus 100 according to the first embodiment. Three axes of the graph indicate an optical path length [μm], a real part [a. u.], and an imaginary part [a. u.], respectively. As illustrated in FIG. 14, the calculator 150 can extract complex amplitude data near the optical path length (near $x_{peak}$) corresponding to the peak of the wafer thickness in step ST24. The extracted complex amplitude data includes a spiral component.

(Step ST25)

Figure 15:
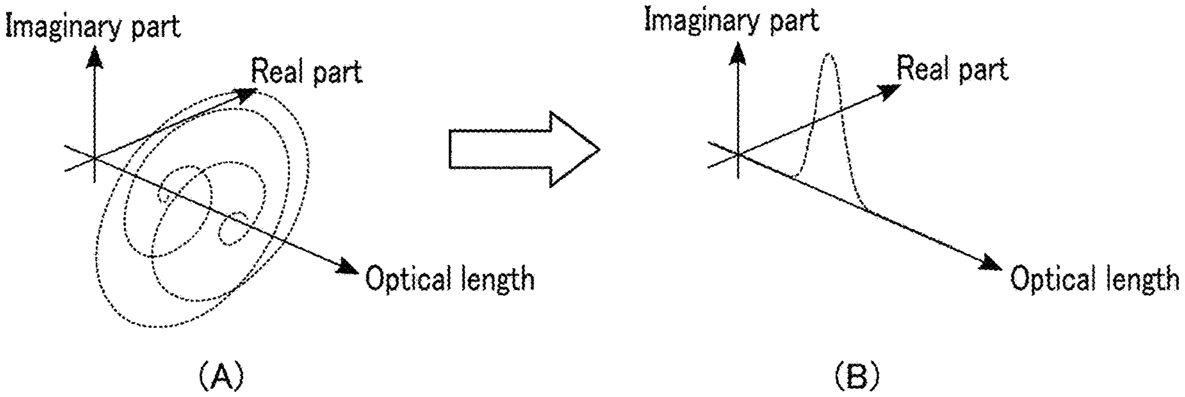
FIG. 15 is a diagram illustrating an example of complex amplitudes before and after removal of a spiral component by the measuring apparatus according to the first embodiment.

In step ST25, the calculator 150 of the measuring apparatus 100 removes a spiral component corresponding to the center frequency $\nu_0$ of the incident light. FIG. 15 is a diagram illustrating an example of complex amplitudes before and after removal of the spiral component by the measuring apparatus 100 according to the first embodiment. Three axes of the graph indicate an optical path length, a real part, and an imaginary part, respectively. (A) of FIG. 15 illustrates an image of complex amplitude data before removal of the spiral component. (B) of FIG. 15 illustrates an image of complex amplitude data after removal of the spiral component.

The extracted complex amplitude has a spiral waveform as illustrated in (A) of FIG. 15. In step ST25, first, the calculator 150 calculates the phase angle of the complex amplitude component at each optical path length. Then, the calculator 150 performs processing of rewinding the complex amplitude in each optical path length around the axis of the optical path length using the calculated phase angle. Thus, the calculator 150 can align the phase angles in the respective optical path lengths, and can obtain a planar Gaussian waveform as illustrated in (B) of FIG. 15.

In the present specification, such processing is referred to as removal of the helical component of the phase. The set of phase angles used for rewinding is called a phase angle data set. The calculator 150 may obtain the phase angle data set in advance from spectroscopic spectrum data using a bare silicon wafer, instead of obtaining the phase angle data set in each sampling step of the wafer temperature measurement. Thus, the calculator 150 can execute a rewinding process in each sampling step of the interference spectrum using the phase angle data set obtained in advance.

Note that, in a case where the disturbance from the substrate proximity layer is small in the wafer as a target of wafer temperature measurement, the calculator 150 may obtain a phase data set from the data of the interference spectrum obtained at the start of the processing of performing the wafer temperature measurement.

(Step ST26)

Figure 16:
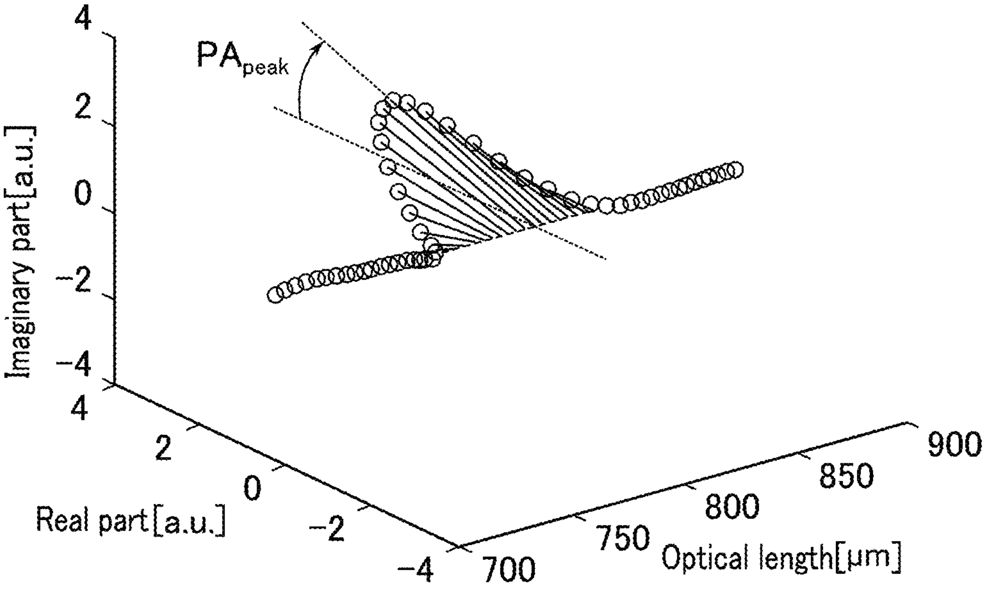
FIG. 16 is a diagram illustrating an example of a planar Gaussian waveform and a phase angle corresponding to an amplitude peak position by the measuring apparatus according to the first embodiment.

In step ST26, the calculator 150 of the measuring apparatus 100 derives the phase angle at the amplitude peak position. FIG. 16 is a diagram illustrating an example of a planar Gaussian waveform and a phase angle corresponding to an amplitude peak position by the measuring apparatus 100 according to the first embodiment. Three axes of the graph indicate an optical path length [μm], a real part [a. u.], and an imaginary part [a. u.], respectively. As illustrated in FIG. 16, the calculator 150 can calculate the phase angle $PA_{peak}$ near the peak position of the complex amplitude. Note that, as the phase angle $PA_{peak}$, a phase angle between the plane including the planar Gaussian and the axis of the real part may be used, or a phase angle between the plane including the planar Gaussian and the axis of the imaginary part may be used.

(Step ST27)

Figure 17:
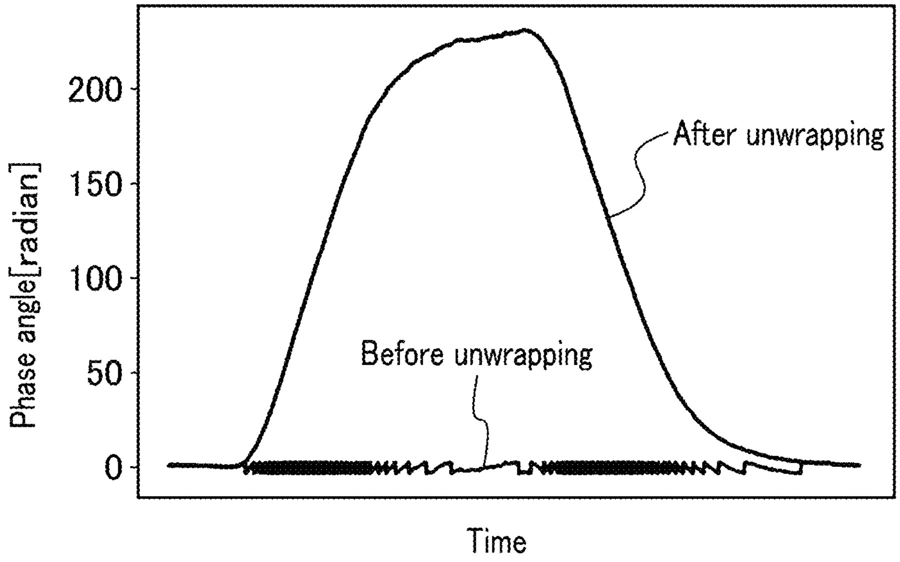
FIG. 17 is a diagram illustrating an example of phase angle unwrapping processing by the measuring apparatus according to the first embodiment.

In step ST27, the calculator 150 of the measuring apparatus 100 executes unwrapping processing (phase recovery processing). FIG. 17 is a diagram illustrating an example of the unwrapping processing of the phase angle by the measuring apparatus 100 according to the first embodiment. The horizontal axis of the graph indicates time, and the vertical axis of the graph indicates the phase angle [radian]. As illustrated in FIG. 17, the wafer temperature changes with the lapse of the process time, and the phase angle may also change accompanying the change in the wafer temperature. Since folding occurs when the phase angle exceeds the range of ±π, the calculator 150 executes the unwrapping processing of the phase angle. For example, the calculator 150 performs the unwrapping processing of the phase angle for each sampling using the phase angle subjected to the unwrapping processing before one sampling. Thus, the calculator 150 can convert the waveform of the phase angle from a discontinuous waveform as illustrated before unwrapping in FIG. 17 to a continuous waveform as illustrated after unwrapping in FIG. 17.

(Step ST28)

In step ST28, the calculator 150 of the measuring apparatus 100 derives the temperature change amount by multiplying the phase angle by the conversion coefficient, and calculates the wafer temperature with the wafer initial temperature as a reference. Specifically, the difference between the phase angle at the start of measurement and the unwrapped phase angle at each time is proportional to the temperature change amount of the wafer. Thus, the calculator 150 converts the change amount of the unwrapped phase angle into the change amount of the wafer temperature using the conversion coefficient between the change amount of the phase angle and the wafer temperature calculated in the preliminary preparation. Specifically, the calculator 150 multiplies the change amount of the unwrapped phase angle by the conversion coefficient calculated in step ST11. Then, the calculator 150 performs conversion into the wafer temperature by adding the change amount of the wafer temperature converted with the wafer initial temperature acquired in step ST21 as a reference. Note that the calculator 150 may calculate the current wafer temperature with the wafer temperature at a certain time during the measurement as a reference. In this case, as the change amount of the unwrapped phase angle, a difference from the time when the reference wafer temperature is acquired is used. Thus, the wafer initial temperature used in the measurement processing may be referred to as a reference temperature.

Note that, in the above description, the case where the calculator 150 of the measuring apparatus 100 derives the waveform of the complex amplitude by Fourier transform of the interference spectrum has been described, but the embodiment is not limited thereto. In the measurement processing, the processing corresponding to the Fourier transform may be replaced with the inverse Fourier transform. Even in such a case, the measuring apparatus 100 can calculate the change amount of the wafer temperature based on the change amount of the phase angle of the waveform of the complex amplitude.

In the above description, the conversion coefficient between the change amount of the phase angle and the change amount of the wafer temperature is derived by the preliminary preparation, and the change amount of the wafer temperature is calculated based on the conversion coefficient in the measurement processing. However, the embodiment is not limited to this. The "conversion coefficient" in each of the preliminary preparation and the measurement processing may be replaced with a conversion function. In this case, the conversion processing from the change amount of the phase angle to the change amount of the wafer temperature in step ST28 is executed using a conversion function such as a polynomial instead of the processing of multiplying a proportional coefficient.

<1-4> Effects of First Embodiment

Hereinafter, effects of the measuring apparatus 100 according to the first embodiment will be described.

In the semiconductor manufacturing process, the influence on the temperature of the wafer to be processed is large, and the wafer temperature may cause variations in the processing shape. Thus, in the semiconductor manufacturing process, it may be required to precisely manage the wafer temperature. As a method of knowing the wafer temperature, a method of measuring the temperature of the wafer stage and indirectly measuring the wafer temperature is known. However, there is a case where the temperature of the wafer stage and the wafer temperature deviate from each other. Thus, in the indirect temperature measurement, it may be difficult to measure the wafer temperature following the change in the process condition. Therefore, it is preferable that the wafer temperature can be directly measured during the process.

Thus, in the measurement processing of the wafer temperature, the measuring apparatus 100 according to the first embodiment is configured to execute (1) irradiating the wafer with light, (2) acquiring an interference spectrum from reflected light (interference light) from the wafer, (3) performing Fourier transform on the acquired interference spectrum, (4) extracting a waveform from the Fourier-transformed waveform, (5) obtaining a phase angle at a peak position of the extracted waveform, (6) calculating a change amount of the wafer temperature based on the phase angle, and (7) calculating the wafer temperature based on the change amount of the wafer temperature and the initial wafer temperature.

Figure 18:
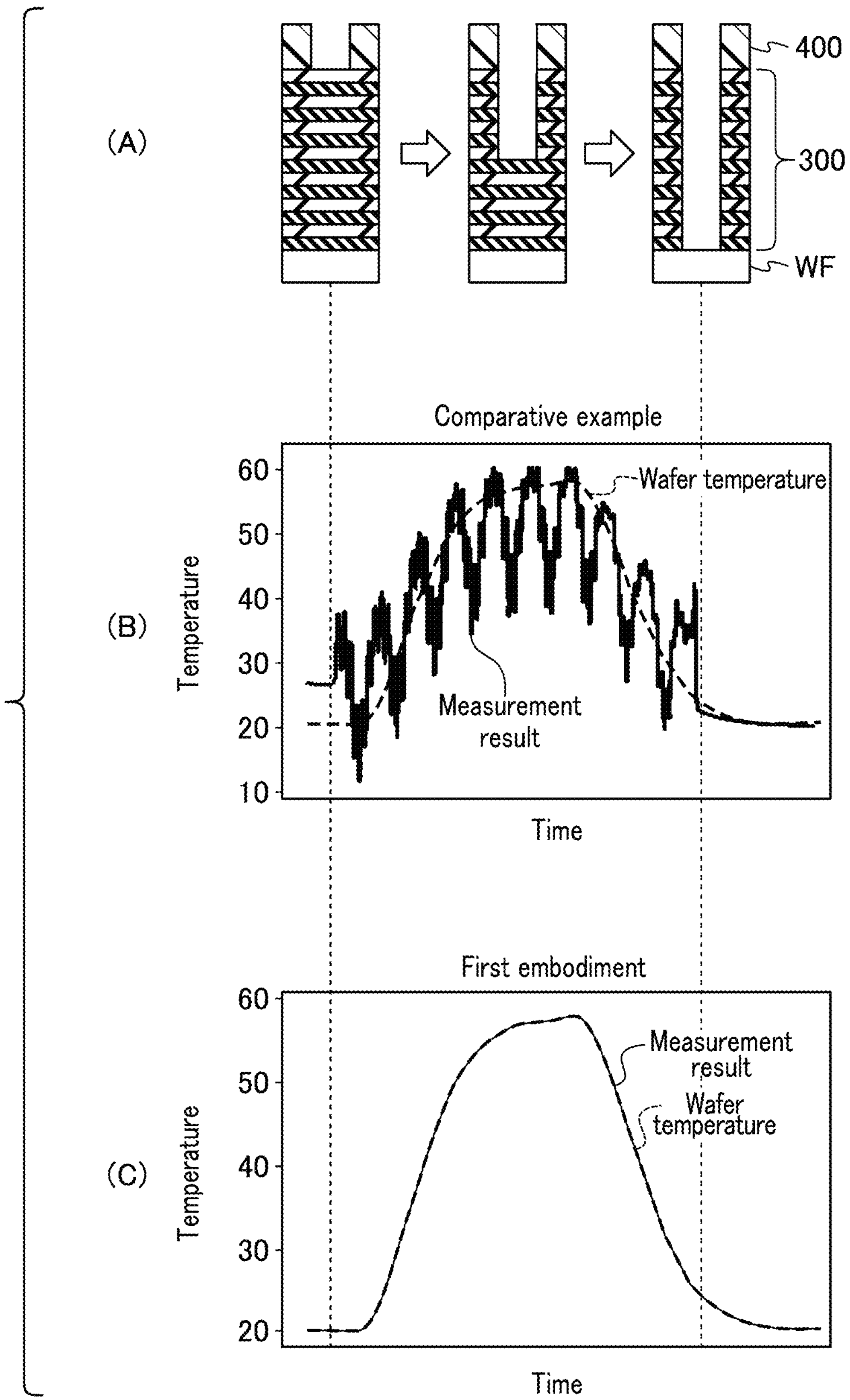
FIG. 18 is a diagram illustrating an example of a simulation result of temperature measurement during etching by the measuring apparatus according to the first embodiment.

FIG. 18 is a diagram illustrating an example of a simulation result of temperature measurement during etching by the measuring apparatus 100 according to the first embodiment. (A) of FIG. 18 illustrates a change in the proximity layer 300 during the etching process by the processing apparatus 200. (B) of FIG. 18 illustrates, as a comparative example, the relationship between a measurement result of the temperature based on the peak position of the complex amplitude and the wafer temperature. (C) of FIG. 18 corresponds to the first embodiment, and illustrates the relationship between a measurement result of the temperature based on the phase angle and the wafer temperature.

As illustrated in (A) of FIG. 18, the processing apparatus 200 executes a process of forming holes in the proximity layer 300 using a mask 400 formed on the proximity layer 300. In the measurement result of the temperature based on the peak position of the complex amplitude, as illustrated in (B) of FIG. 18, a large error based on noise light from a lower portion of the hole occurs according to the change in the hole depth of the etching target (proximity layer 300). In other words, a large measurement error occurs due to the influence of the noise light due to the displacement of the proximity layer 300 of the substrate. On the other hand, in the measurement result of the temperature based on the phase angle, the measurement result and the wafer temperature substantially coincide with each other as illustrated in (C) of FIG. 18.

Figure 19:
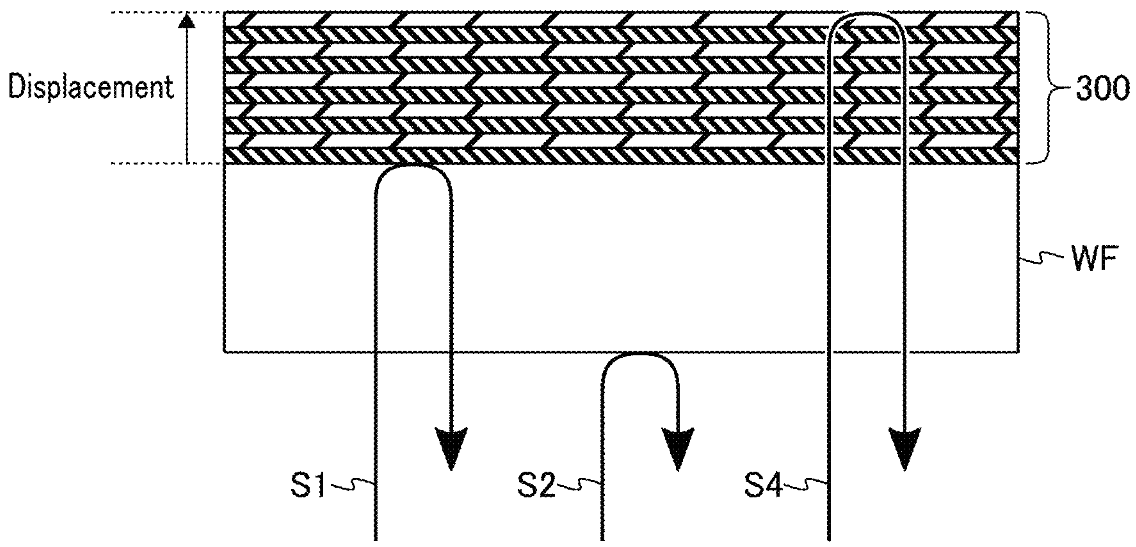
FIG. 19 is a diagram illustrating a third example of a structure of the wafer as a measurement target and components of interference light.

Here, a case where the processing apparatus 200 is a film forming apparatus and executes temperature measurement using optical interference will also be described. FIG. 19 is a diagram illustrating a third example of the structure of the wafer WF as a measurement target and the signal component of the optical interference. As illustrated in FIG. 19, in the present example, the proximity layer 300 is formed on the wafer WF during the process. In this case, the interference light is formed by the signal component S1, the signal component S2, and the noise component S4 interfering with each other. Each of the signal components S1 and S2 is similar to the content described in the first example. The noise component S4 corresponds to reflected light from the surface of the proximity layer 300 where displacement occurs during the process of the processing apparatus 200.

Figure 20:
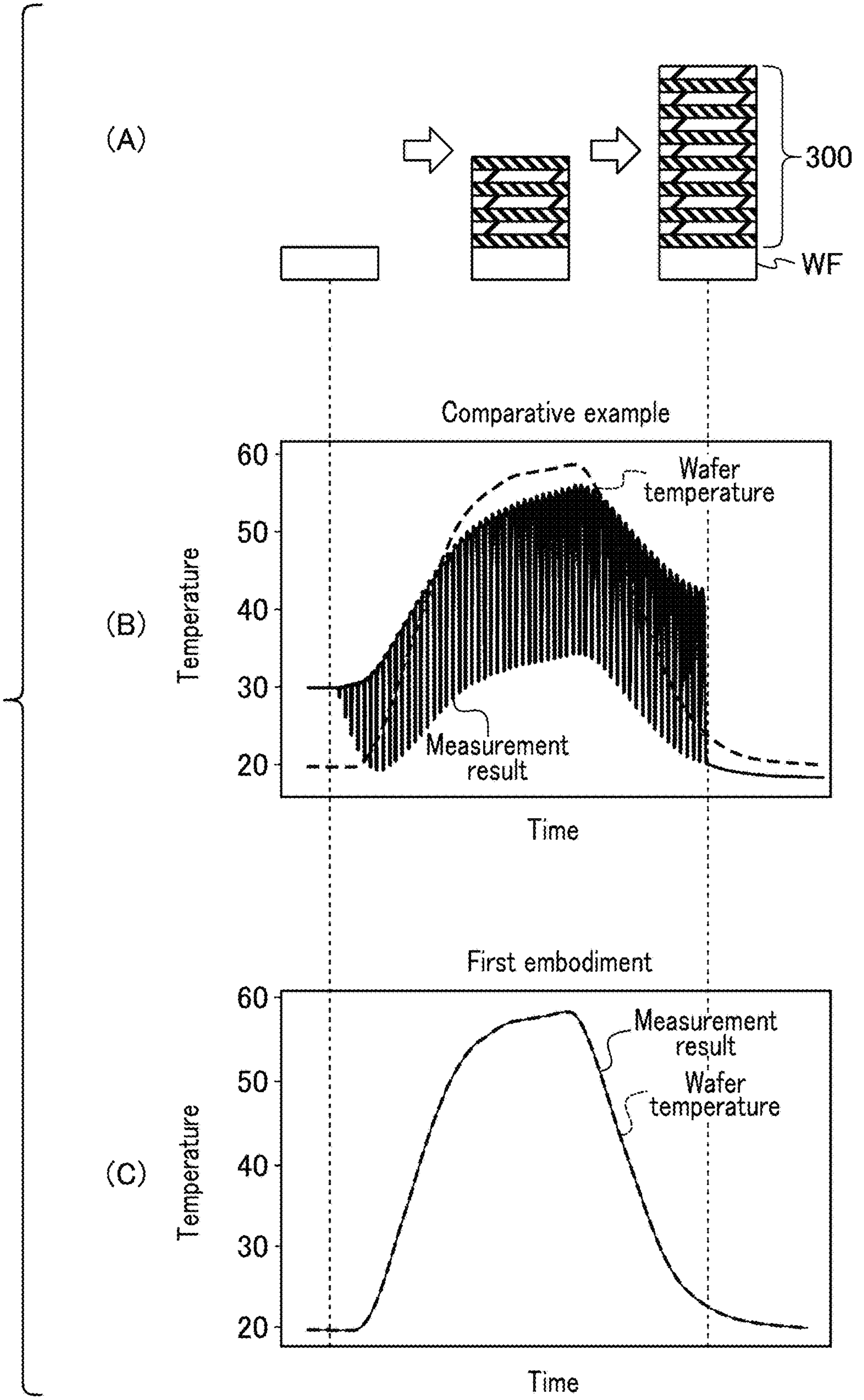
FIG. 20 is a diagram illustrating another example of a simulation result of temperature measurement during film formation by the measuring apparatus according to the first embodiment.

FIG. 20 is a diagram illustrating another example of a simulation result of temperature measurement during film formation by the measuring apparatus 100 according to the first embodiment. (A) of FIG. 20 illustrates a change in the proximity layer 300 during the film forming process by the processing apparatus 200. (B) of FIG. 20 illustrates, as a comparative example, the relationship between a measurement result of the temperature based on the peak position of the complex amplitude and the wafer temperature. (C) of FIG. 20 corresponds to the first embodiment, and illustrates the relationship between a measurement result of the temperature based on the phase angle and the wafer temperature.

As illustrated in (A) of FIG. 20, the processing apparatus 200 alternately stacks two types of members on the proximity layer 300. In the measurement result of the temperature based on the peak position of the complex amplitude, as illustrated in (B) of FIG. 20, a large error based on noise light from the surface of the proximity layer 300 occurs according to a change in the surface position of the proximity layer 300 during film formation. On the other hand, in the measurement result of the temperature based on the phase angle, the measurement result and the wafer temperature substantially coincide with each other as illustrated in (C) of FIG. 20.

As described above, the measuring apparatus 100 according to the first embodiment can implement temperature measurement with high sensitivity and hardly affected by noise by measuring the change in the phase angle of the observation signal. That is, the measuring apparatus 100 according to the first embodiment can directly measure the wafer temperature with high accuracy even in a case where the proximity layer of the silicon substrate changes. Therefore, the measuring apparatus 100 according to the first embodiment can reduce an error in temperature measurement due to an optical disturbance accompanying a change in the optical path length of the substrate proximity layer.

<2> Second Embodiment

A measuring apparatus 100A according to the second embodiment measures temperatures at a plurality of locations using a set of a light source 110, an optical system 120, a spectrometer 140, and a calculator 150. Hereinafter, details of the measuring apparatus 100A according to the second embodiment will be mainly described on differences from the first embodiment.

<2-1> Configuration

Figure 21:
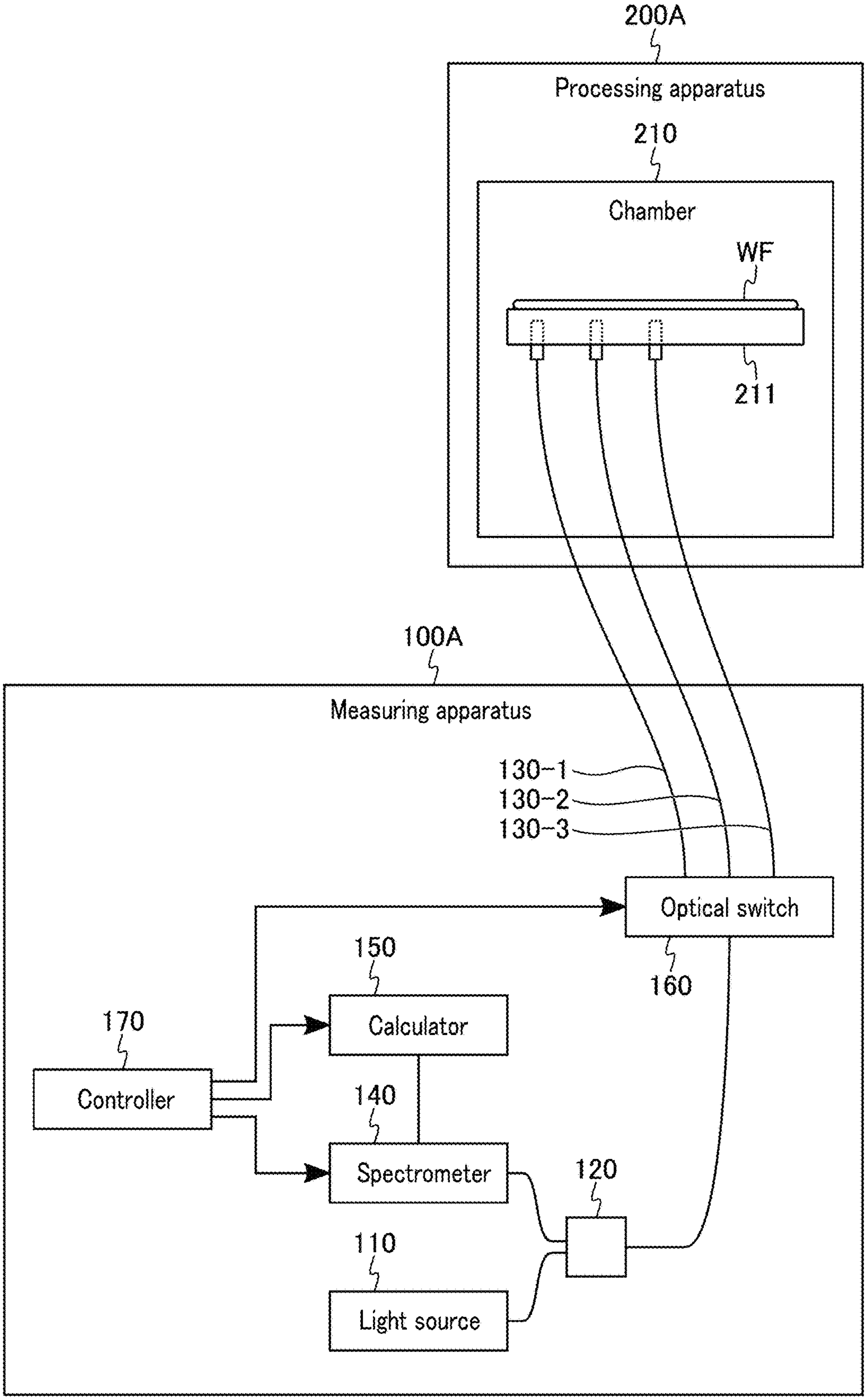
FIG. 21 is a block diagram illustrating an example of a configuration of a measuring apparatus and a processing apparatus according to a second embodiment.

FIG. 21 is a block diagram illustrating an example of a configuration of a measuring apparatus 100A and a processing apparatus 200A according to the second embodiment. As illustrated in FIG. 21, the measuring apparatus 100A includes, for example, a light source 110, an optical system 120, a plurality of measurement probes 130, a spectrometer 140, a calculator 150, an optical switch 160, and a controller 170. The configurations of the light source 110, the optical system 120, the measurement probe 130, the spectrometer 140, and the calculator 150 are similar to those of the first embodiment. The plurality of measurement probes 130 is installed at different positions on the wafer stage 211.

The optical switch 160 is connected between the optical system 120 and the plurality of measurement probes 130. The optical switch 160 optically connects one of the plurality of measurement probes 130 and the optical system 120. In other words, the optical switch 160 is configured to be capable of switching the output destination of the measurement light to any one of the plurality of measurement probes 130. The optical switch 160 can switch the measurement probe 130 connected to the optical system 120 based on an instruction from the controller 170. The optical switch 160 may be referred to as an optical path splitter.

The controller 170 has, for example, a configuration similar to that of the calculator 150. The controller 170 controls the spectrometer 140, the calculator 150, and the optical switch 160. For example, the controller 170 notifies the spectrometer 140 of the sampling timing of the interference spectrum. The controller 170 notifies the calculator 150 of a temperature measurement point for each sampling, that is, switching information of the optical switch 160. The controller 170 notifies the optical switch 160 of the measurement probe 130 connected to the optical system 120 for each sampling. Note that, in the second embodiment, the controller 170 may have a function as the calculator 150, and the controller 170 and the calculator 150 may be integrated.

In the second embodiment, the spectrometer 140 can separate and measure interference spectra from two or more measurement probes 130, that is, interference spectra from a plurality of measurement points, by the optical switch 160. Specifically, the measurement of the interference spectrum from the plurality of measurement points can be implemented by performing measurement separately in time by the optical switch 160.

Note that the optical switch 160 may be configured to divide a plurality of types of light source wavelengths by an optical filter or an optical splitter. Then, the spectrometer 140 may temporally separate and measure the plurality of measurement points using the plurality of divided light source wavelengths.

In addition, the optical switch 160 may be configured to divide a plurality of types of polarization states by a polarization filter or a polarization splitter. Then, the spectrometer 140 may temporally separate and measure a plurality of measurement points using a plurality of types of divided polarization states.

Other configurations of the measuring apparatus 100A and the processing apparatus 200A according to the second embodiment are similar to those of the first embodiment.

<2-2> Measuring Method

Figure 22:
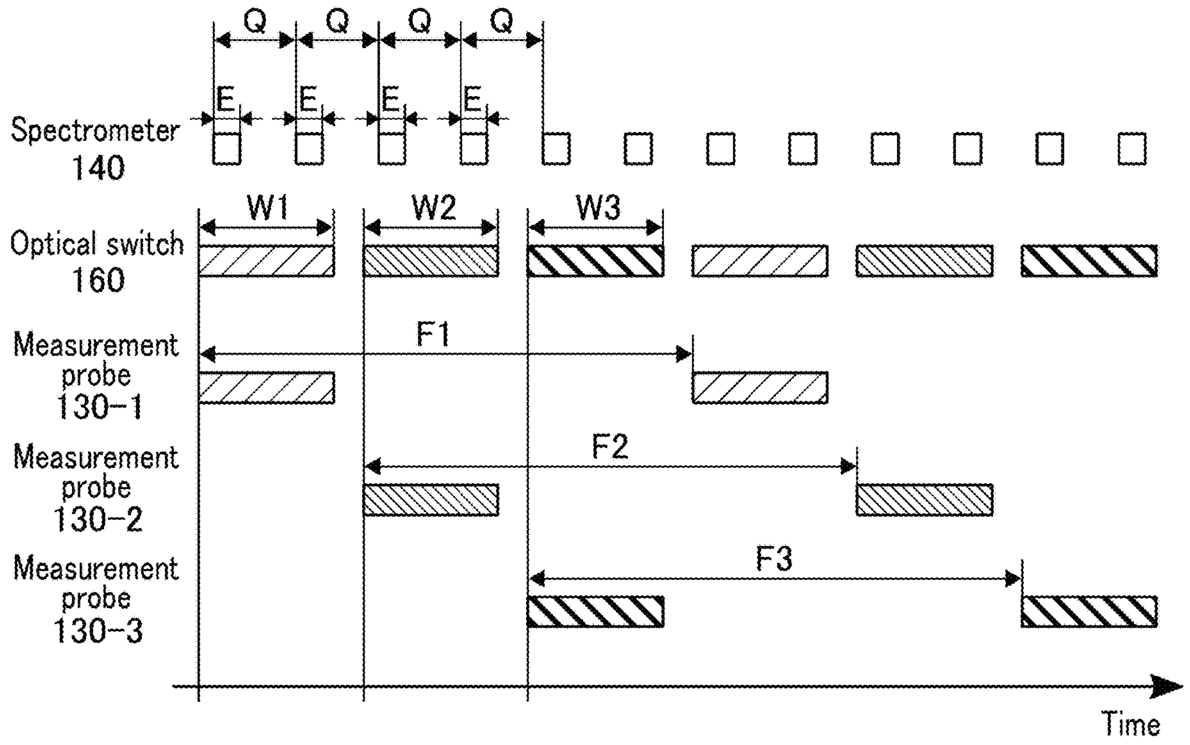
FIG. 22 is a timing chart illustrating an example of a measuring method of the measuring apparatus according to the second embodiment.

FIG. 22 is a timing chart illustrating an example of a measuring method of the measuring apparatus 100A according to the second embodiment. FIG. 22 illustrates a concept of a temporal switching method of the optical switch 160. In FIG. 22, an exposure time of light emitted from the light source 110 is indicated by “E”. A sampling period of the spectrometer 140 is indicated by “Q”. Respective switching times of the optical switch 160 corresponding to the three measurement points (that is, three measurement probes 130-1, 130-2, and 130-3) are indicated by “W1”, “W2”, and “W3”. Respective switching cycles of the optical switch 160 corresponding to the three measurement points are indicated by “F1”, “F2”, and “F3”. In this example, the switching cycles F1, F2, and F3 are set to equal cycles.

As illustrated in FIG. 22, the controller 170 sets the switching time of the optical switch 160 so as to include the exposure time E of each measurement point. In this example, each of the switching times W1, W2, and W3 includes two exposure times E. Specifically, the spectrometer 140 measures the interference spectrum of the measurement point corresponding to the measurement probe 130-1 at the exposure time E set to overlap with the switching time W1. The spectrometer 140 measures the interference spectrum of the measurement point corresponding to the measurement probe 130-2 at the exposure time E set to overlap with the switching time W2. The spectrometer 140 measures the interference spectrum of the measurement point corresponding to the measurement probe 130-3 at the exposure time E set to overlap with the switching time W3.

The calculator 150 specifies a measurement point of measurement light based on the switching information of the optical switch 160 obtained from the controller 170. The calculator 150 can then calculate the temperature of each of a plurality of measurement points based on information of the corresponding interference spectrum.

Note that the number of exposure times E set for each switching time only needs to be one or more. In addition, the switching cycle for each measurement point may be set to a different cycle as long as the switching times do not overlap each other. In FIG. 22, the case where the number of measurement points is 3 has been exemplified, but the embodiment is not limited thereto. In the second embodiment, the number of measurement points only needs to be two or more. The number of measurement probes 130 corresponding to the number of measurement points is connected to the optical switch 160 of the measuring apparatus 100A. In addition, the measuring apparatus 100A may measure measurement light having a plurality of wavelength bands and polarization states by dividing the measurement light into a plurality of measurement points using a wavelength filter, a beam splitter, a polarizer, or the like, instead of measuring a plurality of measurement points by being temporally divided.

<2-3> Effects of Second Embodiment

The measuring apparatus 100A according to the second embodiment can measure a plurality of measurement points by one set of the light source 110 and the spectrometer 140 by temporally switching the irradiation destination of the measurement light from the light source 110 to the optical switch 160. Thus, the measuring apparatus 100A according to the second embodiment can suppress the cost of the measuring apparatus for measuring the temperatures at the plurality of points.

<2-4> Modification of Second Embodiment

The measuring apparatus 100A according to the second embodiment can be variously modified. Hereinafter, a first modification and a second modification of the second embodiment will be described in order.

<2-4-1> First Modification

Figure 23:
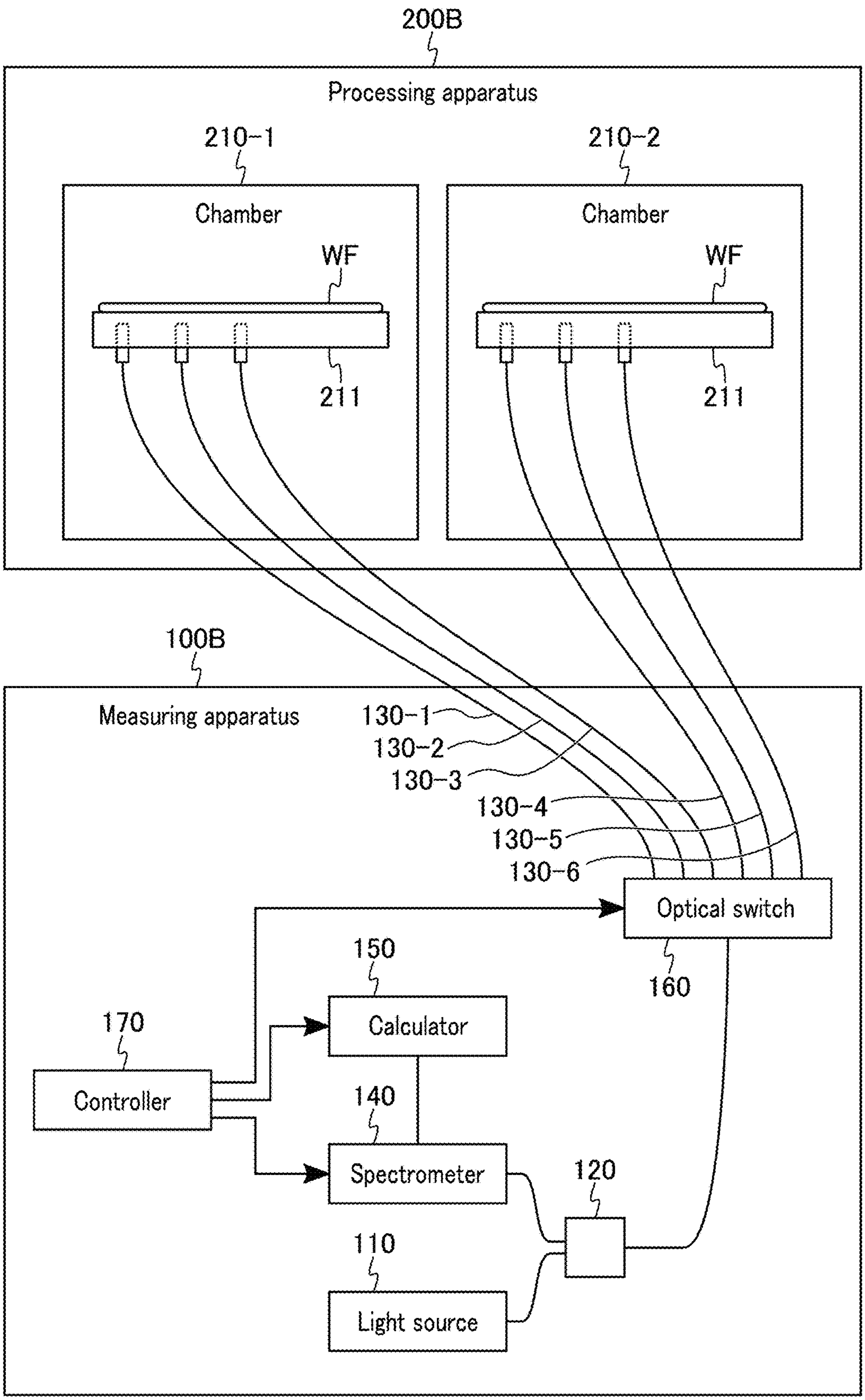
FIG. 23 is a block diagram illustrating an example of a configuration of a measuring apparatus and a processing apparatus according to a first modification of the second embodiment.

FIG. 23 is a block diagram illustrating an example of configurations of a measuring apparatus 100B and a processing apparatus 200B according to a first modification of the second embodiment. As illustrated in FIG. 23, the measuring apparatus 100B has a configuration similar to that of the measuring apparatus 100A. The processing apparatus 200B includes a plurality of chambers 210-1 and 210-2. The configuration of each chamber 210 is similar to that of the first embodiment. The measurement probes 130-1 to 130-3 of the measuring apparatus 100B are connected to the wafer stage 211 of the chamber 210-1. The measurement probes 130-4 to 130-6 of the measuring apparatus 100B are connected to the wafer stage 211 of the chamber 210-2. In this manner, the measuring apparatus 100B may be configured to perform temperature measurement for the plurality of chambers 210 included in the processing apparatus 200B.

<2-4-2> Second Modification

Figure 24:
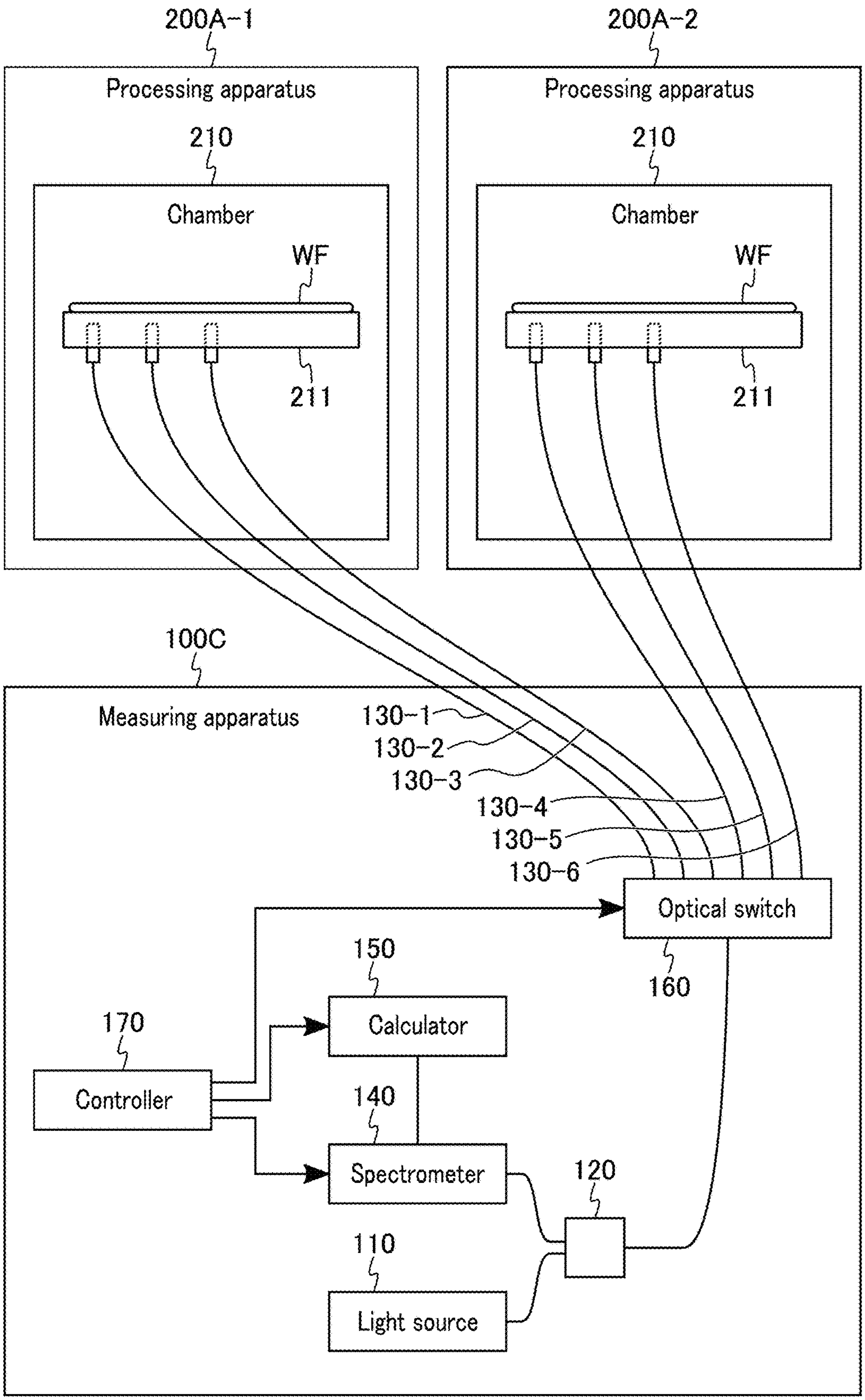
FIG. 24 is a block diagram illustrating an example of a configuration of a measuring apparatus and a processing apparatus according to a second modification of the second embodiment.

FIG. 24 is a block diagram illustrating an example of configurations of a measuring apparatus 100C and a processing apparatus 200A according to a second modification of the second embodiment. As illustrated in FIG. 24, the measuring apparatus 100C has a configuration similar to that of the measuring apparatus 100B. In the present example, the measuring apparatus 100C is configured to be able to measure the temperatures of the plurality of processing apparatuses 200A-1 and 200A-2. Specifically, the measurement probes 130-1 to 130-3 of the measuring apparatus 100C are connected to the wafer stage 211 of the chamber 210 of the processing apparatus 200A-1. The measurement probes 130-4 to 130-6 of the measuring apparatus 100C are connected to the wafer stage 211 of the chamber 210 of the processing apparatus 200A-2. In this manner, the measuring apparatus 100C may be configured to execute temperature measurement for the plurality of processing apparatuses 200A.

<3> Third Embodiment

In measurement of a wafer thickness using optical interference, a measuring apparatus 100 according to a third embodiment uses a change amount of the phase angle of the complex amplitude based on the acquired interference spectrum similarly to the first embodiment. Hereinafter, the details of the measuring apparatus 100 according to the third embodiment will be mainly described on differences from the first embodiment.

<3-1> Configuration

The configuration of the measuring apparatus 100 according to the third embodiment is, for example, similar to that of the measuring apparatus 100 according to the first embodiment.

<3-2> Measuring Method

The principle used in wafer thickness measurement using the optical interference in the measuring apparatus 100 according to the third embodiment is similar to that of the first embodiment. Hereinafter, as a method of manufacturing a semiconductor device, a specific example of a method of measuring a wafer thickness by the measuring apparatus 100 according to the third embodiment will be described.

<3-2-1> Preliminary Preparation

Figure 25:
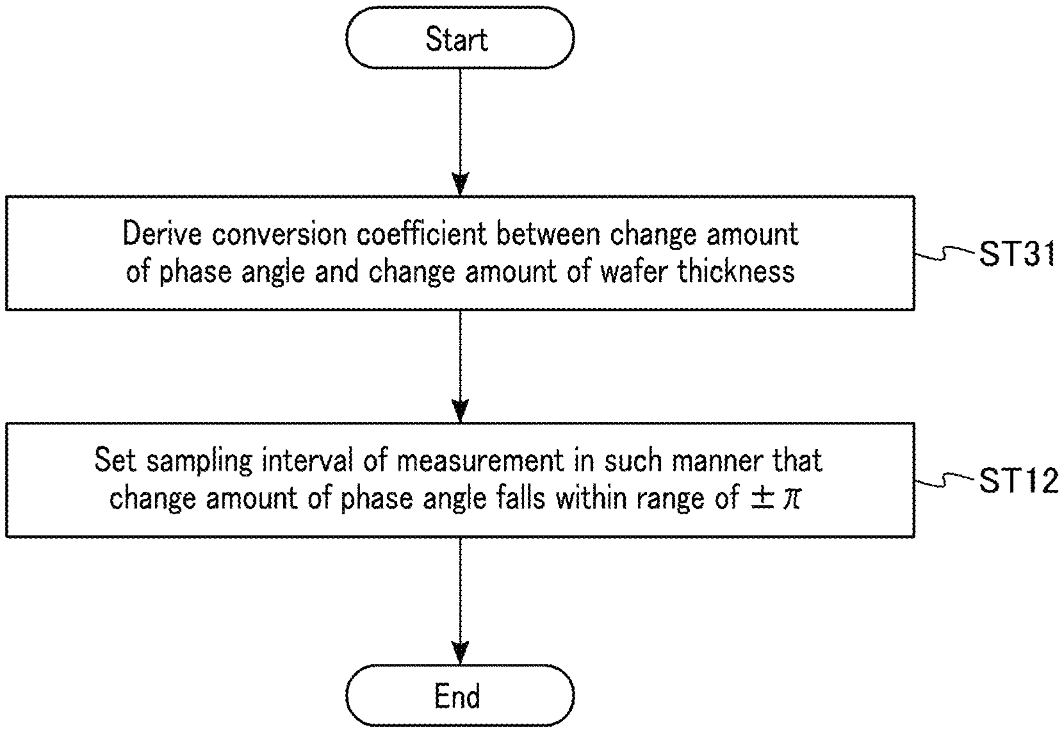
FIG. 25 is a flowchart illustrating an example of preliminary preparation for measurement processing by a measuring apparatus according to a third embodiment.

FIG. 25 is a flowchart illustrating an example of preliminary preparation for measurement processing by the measuring apparatus 100 according to the third embodiment. As illustrated in FIG. 25, in the preliminary preparation, the processing of steps ST31 and ST12 is sequentially executed.

(Step ST31)

In step ST31, a conversion coefficient between a change amount of the phase angle and a change amount of the wafer thickness is derived. In other words, the calculator 150 calculates a calibration line between the change amount of the phase angle and the wafer thickness. The conversion coefficient between the change amount of the phase angle and the change amount of the wafer thickness may be derived by, for example, an experiment. The conversion coefficient between the change amount of the phase angle and the change amount of the wafer thickness may be calculated by simulation using information such as an accurate optical coefficient and the wafer thickness. Note that the conversion coefficient may be calculated by the measuring apparatus 100, or the conversion coefficient calculated by an external device may be used by the measuring apparatus 100.

(Step ST12)

In step ST12, the calculator 150 of the measuring apparatus sets a sampling interval of measurement of the wafer thickness in such a manner that the change amount of the phase angle falls within the range of $\pm\pi$ as in the first embodiment. Note that the sampling interval may be calculated by the measuring apparatus 100, or a sampling interval calculated by an external device may be used by the measuring apparatus 100.

<3-2-2> Measurement Processing

Figure 26:
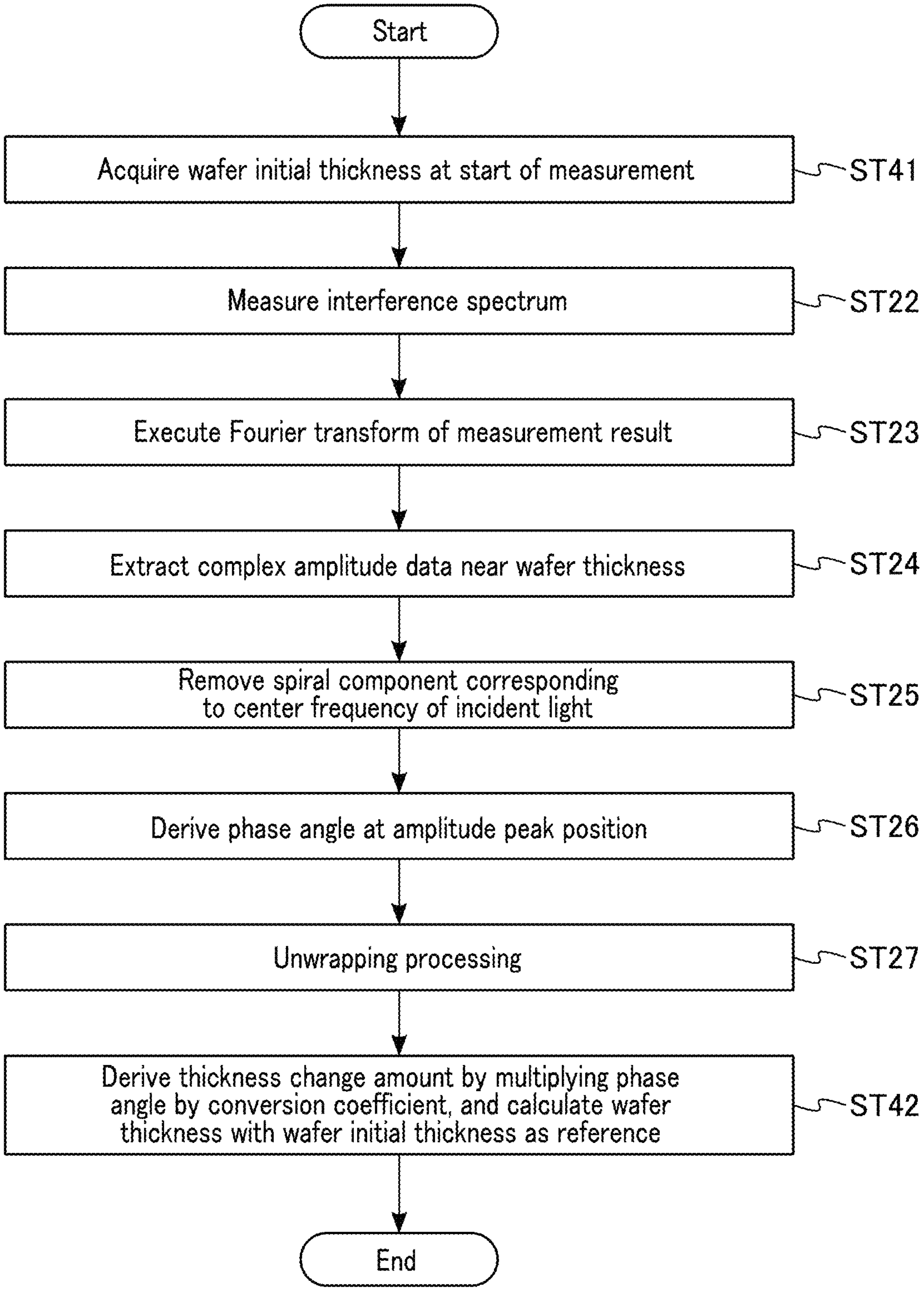
FIG. 26 is a flowchart illustrating an example of measurement processing by the measuring apparatus according to the third embodiment.

FIG. 26 is a flowchart illustrating an example of measurement processing by the measuring apparatus 100 according to the third embodiment. As illustrated in FIG. 26, in the measurement processing, processing of steps ST41, ST22 to ST27, and ST42 is sequentially executed. Note that the measurement processing is executed at predetermined sampling intervals during the process of the measurement target object, that is, in a state where the structure of the measurement target object changes. For example, the wafer WF to be processed by the processing apparatus 200 is the measurement target object.

(Step ST41)

In step ST41, the calculator 150 of the measuring apparatus 100 acquires a wafer initial thickness at the start of measurement from the processing apparatus 200 or another measuring apparatus. In the measuring method of the wafer thickness in the third embodiment, the change amount of the wafer thickness is calculated. Thus, in order to calculate the wafer thickness, it is required that the wafer thickness at a certain point of time as a reference be acquired by another method. Note that the calculator 150 need not use the thickness at the process start time as the wafer initial thickness, and may use the wafer thickness at any time. Hereinafter, a third method will be described as a specific example of the method of measuring the initial thickness of the wafer.

In the third method, the wafer temperature and the wafer thickness are measured at another place before the wafer is transferred to the chamber 210, and the wafer initial thickness is calculated based on the difference between a wafer initial temperature calculated after the transfer to the chamber 210 and the measured wafer temperature, a thermal expansion coefficient of the wafer, and the measured wafer thickness. In addition, the other place may be in a measurement machine of another measurement step before the process, may be a temperature-controlled thermostatic chamber, or may be on the transfer arm 220. Since there is no high-pressure high-frequency electric field used for plasma generation, a simple temperature measuring method such as a thermocouple may be used for the wafer temperature measurement in the measurement machine, the thermostatic chamber, and the transfer arm 220. In addition, the initial wafer thickness may be calculated based on a measurement value of the wafer thickness measured by another film thickness measuring apparatus.

In the calculation of the wafer initial temperature described above, similarly to the first method and the second method described in step ST21 of the first embodiment, the relationship between the wafer temperature and the ESC temperature during the process as illustrated in FIG. 4 is obtained in advance, and the ESC temperature at the time when the wafer temperature matches or approaches the ESC temperature is set as the wafer initial temperature. For example, the calculator 150 sets the ESC temperature acquired by the temperature sensor 230 as the wafer initial temperature when a certain period of time has elapsed from time t1 (chuck and start inflow of helium gas for cooling) illustrated in FIG. 4 and the wafer temperature matches the ESC temperature. Alternatively, the calculator 150 may set the ESC temperature acquired by the temperature sensor 230 as the wafer initial temperature when a certain period of time has elapsed from time t3 (plasma off) illustrated in FIG. 4 and the wafer temperature and the ESC temperature match or approach each other.

(Step ST22)

In step ST22, the spectrometer 140 of the measuring apparatus 100 measures the interference spectrum as in step ST22 of the first embodiment illustrated in FIG. 11.

(Step ST23)

In step ST23, the calculator 150 of the measuring apparatus 100 executes the Fourier transform of the measurement result as in step ST23 of the first embodiment illustrated in FIG. 11.

(Step ST24)

In step ST24, the calculator 150 of the measuring apparatus 100 extracts (cuts out) complex amplitude data near the wafer thickness, as in step ST24 of the first embodiment illustrated in FIG. 11.

(Step ST25)

In step ST25, the calculator 150 of the measuring apparatus 100 removes a spiral component corresponding to the center frequency $\nu_0$ of the incident light as in step ST25 of the first embodiment illustrated in FIG. 11.

(Step ST26)

In step ST26, the calculator 150 of the measuring apparatus 100 derives the phase angle at the amplitude peak position as in step ST26 of the first embodiment illustrated in FIG. 11.

(Step ST27)

In step ST27, the calculator 150 of the measuring apparatus 100 performs an unwrapping processing (phase recovery processing) as in step ST27 of the first embodiment illustrated in FIG. 11.

(Step ST42)

In step ST42, the calculator 150 of the measuring apparatus 100 derives a thickness change amount by multiplying the phase angle by the conversion coefficient, and calculates a wafer thickness with the wafer initial thickness as a reference. Specifically, the difference between the phase angle at the start of measurement and the unwrapped phase angle at each time is proportional to the thickness change amount of the wafer. Thus, the calculator 150 converts the change amount of the unwrapped phase angle into the change amount of the wafer thickness by using the conversion coefficient between the change amount of the phase angle calculated in the preliminary preparation and the wafer thickness. Specifically, the calculator 150 multiplies the change amount of the unwrapped phase angle by the conversion coefficient calculated in step ST31. Then, the calculator 150 performs conversion into the wafer thickness by adding the change amount of the wafer thickness converted with the wafer initial thickness acquired in step ST41 as a reference. Note that the calculator 150 may calculate the current wafer thickness with the wafer thickness at a certain time during the measurement as a reference. In this case, as the change amount of the unwrapped phase angle, a difference from the time when the reference wafer thickness is acquired is used. Thus, the wafer initial thickness used in the measurement processing may be referred to as a reference thickness.

Note that, in the above description, the case where the calculator 150 of the measuring apparatus 100 derives the waveform of the complex amplitude by Fourier transform of the interference spectrum has been described, but the embodiment is not limited thereto. In the measurement processing, the processing corresponding to the Fourier transform may be replaced with the inverse Fourier transform. Even in such a case, the measuring apparatus 100 can calculate the change amount of the wafer thickness based on the change amount of the phase angle of the waveform of the complex amplitude.

In the above description, the conversion coefficient between the change amount of the phase angle and the change amount of the wafer thickness is derived by preliminary preparation, and the change amount of the wafer thickness is calculated based on the conversion coefficient in the measurement processing. However, the embodiment is not limited to this. The "conversion coefficient" in each of the preliminary preparation and the measurement processing may be replaced with a conversion function. In this case, the conversion processing from the change amount of the phase angle into the change amount of the wafer thickness in step ST42 is executed using a conversion function such as a polynomial instead of the processing of multiplying a proportional coefficient.

<3-2-3> Measurement Target

Figure 27:
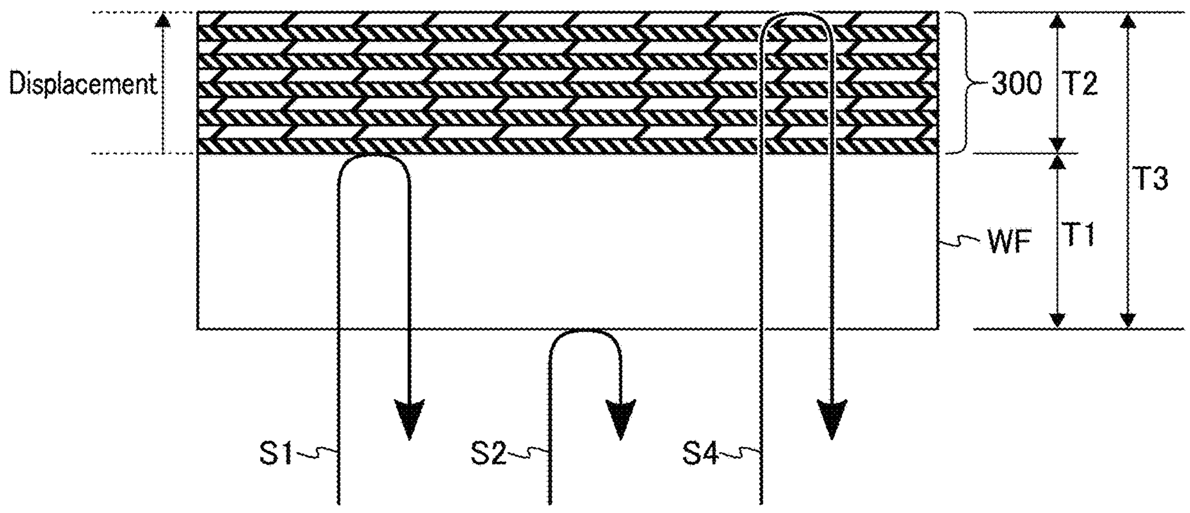
FIG. 27 is a diagram illustrating one of measurement targets of a wafer thickness in the measuring apparatus according to the third embodiment.

FIG. 27 is a diagram illustrating an example of a measurement target of the wafer thickness in the measuring apparatus 100 according to the third embodiment. In FIG. 27, a portion that can be measured by the measuring apparatus 100 according to the third embodiment is added to the third example of the structure of the wafer WF as a measurement target and the signal component of the optical interference illustrated in FIG. 19. As illustrated in FIG. 27, the measuring apparatus 100 according to the third embodiment can measure any one of the thicknesses T1, T2, and T3 and displacement thereof according to the relationship between the wafer WF and the proximity layer 300. That is, the wafer thickness as a measurement target in the third embodiment is not limited to the thickness T1 of the wafer WF, and may be the thickness T2 of the proximity layer 300 or the total thickness T3 of the wafer WF and the proximity layer 300. The measuring apparatus 100 according to the third embodiment can measure, for example, a change in the thickness T1 of the wafer WF in back grinding processing of the wafer WF. Note that the method of measuring the wafer thickness in the measuring apparatus 100 according to the third embodiment is not limited to the example illustrated in FIG. 27, and is also applicable to the example illustrated in FIG. 7.

<3-3> Effects of Third Embodiment

As described above, in the measurement processing of a wafer thickness, the measuring apparatus 100 according to the third embodiment is configured to execute (1) irradiating the wafer with light, (2) acquiring an interference spectrum from reflected light (interference light) from the wafer, (3) performing Fourier transform on the acquired interference spectrum, (4) extracting a waveform from the Fourier-transformed waveform, (5) obtaining a phase angle at a peak position of the extracted waveform, (6) calculating a change amount of the wafer thickness based on the phase angle, and (7) calculating the wafer thickness based on the change amount of the wafer thickness and the initial wafer thickness.

The measuring apparatus 100 according to the third embodiment can implement thickness measurement with high sensitivity and hardly affected by noise by measuring a change in the phase angle of the observation signal similarly to the first embodiment. That is, the measuring apparatus 100 according to the third embodiment can directly measure the wafer thickness with high accuracy even in a case where the proximity layer of the silicon substrate changes. Therefore, the measuring apparatus 100 according to the third embodiment can reduce an error in thickness measurement due to an optical disturbance accompanying a change in the optical path length of the substrate proximity layer. Note that the third embodiment may be combined with the second embodiment. That is, the measuring apparatus 100A according to the second embodiment may be configured to measure the wafer thickness as in the third embodiment.

<4> Others

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A measuring apparatus comprising:

a light source configured to emit measurement light having a wavelength that transmits through a measurement target object;

a spectrometer configured to measure a spectroscopic spectrum waveform of light generated by reflecting the measurement light from the measurement target object; and a calculator configured to:

perform Fourier transform of the spectroscopic spectrum waveform;

extract a waveform from a waveform obtained by the Fourier transform;

calculate a phase angle at an amplitude peak position of the extracted waveform;

calculate a temperature change amount or a thickness change amount of the measurement target object based on the change amount of the phase angle; and calculate a temperature of the measurement target object by adding the temperature change amount to a reference temperature, or calculate a thickness of the measurement target object by adding the thickness change amount to a reference thickness.

2. The measuring apparatus according to claim 1, wherein the calculator is further configured to execute phase recovery processing of the phase angle before calculating the change amount of the phase angle.

3. The measuring apparatus according to claim 1, wherein the calculator is further configured to remove a spiral component of a phase of the extracted waveform before calculating the phase angle.

4. The measuring apparatus according to claim 1, wherein a sampling period in which the spectrometer measures the spectroscopic spectrum waveform is set in such a manner that a change amount of the phase angle falls within a range of $\pm\pi$ in two consecutive samplings.

5. The measuring apparatus according to claim 1, further comprising:

an optical switch capable of switching an output destination of the measurement light to any one of a plurality of measurement probes, wherein the calculator executes the measurement processing for each output destination of the measurement light.

6. A measuring method using a light source configured to emit measurement light having a wavelength that transmits through a measurement target object and a spectrometer configured to measure a spectroscopic spectrum waveform of light generated by reflection of the measurement light on the measurement target object, the measuring method comprising:

executing Fourier transform of the spectroscopic spectrum waveform;

extracting a waveform from a waveform obtained by the Fourier transform;

calculating a phase angle at an amplitude peak position of the extracted waveform;

calculating a temperature change amount or a thickness change amount of the measurement target object based on a change amount of the phase angle; and calculating a temperature of the measurement target object by adding the temperature change amount to a reference temperature, or calculating a thickness of the measurement target object by adding the thickness change amount to a reference thickness.

7. The measuring method according to claim 6, further comprising:

executing phase recovery processing of the phase angle before calculating the change amount of the phase angle.

8. The measuring method according to claim 6, further comprising:

removing a spiral component of a phase of the extracted waveform before calculating the phase angle.

9. The measuring method according to claim 6, wherein a sampling period in which the spectrometer measures the spectroscopic spectrum waveform is set in such a manner that a change amount of the phase angle falls within a range of $\pm\pi$ in two consecutive samplings.

10. The measuring method according to claim 6, further comprising:

switching an output destination of the measurement light to any one of a plurality of measurement points; and measuring a temperature for each output destination of the measurement light.

11. The measuring method according to claim 6, wherein the measurement target object includes a semiconductor substrate.

12. A non-transitory computer readable medium storing a computer program which is executed by a computer using a spectroscopic spectrum waveform of light generated by reflection of measurement light on a measurement target object, the computer program is configured to provide the steps of:

executing Fourier transform of the spectroscopic spectrum waveform, extracting a waveform from a waveform obtained by the Fourier transform, calculating a phase angle at an amplitude peak position of the extracted waveform, calculating a temperature change amount or a thickness change amount of the measurement target object based on a change amount of the phase angle, and calculating a temperature of the measurement target object by adding the temperature change amount to a reference temperature, or calculate a thickness of the measurement target object by adding the thickness change amount to a reference thickness.

13. The non-transitory computer readable medium according to claim 12, the computer program is further configured to provide the steps of:

executing phase recovery processing of the phase angle before calculating the change amount of the phase angle.

14. The non-transitory computer readable medium according to claim 12, the computer program is further configured to provide the step of:

removing a spiral component of a phase of the extracted waveform before calculating the phase angle.

* * * * *